(12) United States Patent
Matsui et al.

(10) Patent No.: US 11,845,629 B2
(45) Date of Patent: Dec. 19, 2023

(54) PARTIALLY SEPARATED FIBER BUNDLE AND METHOD OF MANUFACTURING SAME

(71) Applicant: Toray Industries, Inc., Tokyo (JP)

(72) Inventors: Akihiko Matsui, Nagoya (JP); Masaru Tateyama, Nagoya (JP); Satoshi Seike, Nagoya (JP); Mitsuki Fuse, Nagoya (JP); Hiroshi Hirano, Nagoya (JP); Kazuma Ura, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 365 days.

(21) Appl. No.: 17/275,036

(22) PCT Filed: Jul. 30, 2019

(86) PCT No.: PCT/JP2019/029748
§ 371 (c)(1),
(2) Date: Mar. 10, 2021

(87) PCT Pub. No.: WO2020/066275
PCT Pub. Date: Apr. 2, 2020

(65) Prior Publication Data
US 2022/0055857 A1    Feb. 24, 2022

(30) Foreign Application Priority Data
Sep. 28, 2018   (JP) .................................. 2018-184570

(51) Int. Cl.
*B65H 51/005*    (2006.01)
*D01D 11/02*    (2006.01)
(Continued)

(52) U.S. Cl.
CPC ........... *B65H 51/005* (2013.01); *D01D 11/02* (2013.01); *D02J 1/18* (2013.01); *D06M 15/55* (2013.01);
(Continued)

(58) Field of Classification Search
CPC .................................................... B65H 51/005
See application file for complete search history.

(56) References Cited

U.S. PATENT DOCUMENTS 5,101,542 A * 4/1992 Nakagawa ........... B65H 51/005
                                                    28/282
6,177,195 B1   1/2001 Yabuki et al.
(Continued)

FOREIGN PATENT DOCUMENTS

EP    3 395 526 A1   10/2018
EP    4 129 602 A1    2/2023
(Continued)

OTHER PUBLICATIONS

First Office Action dated May 26, 2022, of counterpart Chinese Application No. 201980056974.2, along with an English translation.

(Continued)

*Primary Examiner* — Andrew T Piziali
(74) *Attorney, Agent, or Firm* — DLA Piper LLP (US)

(57) ABSTRACT

A partially separated fiber bundle includes a separated fiber section and an unseparated fiber section, being configured to give a ratio $A_{max}/A_{min}$ of 1.1 or larger and 3 or smaller, when the number of fiber bundles contained in the width direction of the partially separated fiber bundle (fiber separating number: $N_n$) measured at a freely selected point $P_n$ (where, n represents an integer of 1 to 100, and freely selected points $P_n$ and $P_{n+1}$, excluding n=100, being 50 cm or more away from each other), is divided by a full width of $W_n$ of the partially separated fiber bundle, to calculate the fiber separating number per unit width $A_n$, and assuming its maximum value as $A_{max}$ and its minimum value as $A_{min}$.

4 Claims, 13 Drawing Sheets

(51) Int. Cl.
  *D02J 1/18* (2006.01)
  *D06M 15/55* (2006.01)
  *D06M 15/59* (2006.01)
  *D06M 101/40* (2006.01)

(52) U.S. Cl.
  CPC ....... *D06M 15/59* (2013.01); *B65H 2701/314* (2013.01); *D06M 2101/40* (2013.01); *D10B 2101/12* (2013.01)

(56) References Cited

U.S. PATENT DOCUMENTS

| | | | |
|---|---|---|---|
| 2006/0073311 A1* | 4/2006 | Hogg | B29C 70/545 428/174 |
| 2015/0203642 A1 | 7/2015 | Sonoda et al. | |
| 2016/0083873 A1* | 3/2016 | Kawabe | D02J 1/20 28/283 |
| 2018/0119317 A1 | 5/2018 | Ootsubo et al. | |
| 2018/0194082 A1 | 7/2018 | Samejima et al. | |
| 2019/0161890 A1 | 5/2019 | Motohashi et al. | |
| 2021/0017670 A1 | 1/2021 | Kanehagi et al. | |

FOREIGN PATENT DOCUMENTS

| | | | |
|---|---|---|---|
| JP | 2000-27026 A | 1/2000 | |
| JP | 2002-255448 A | 9/2002 | |
| JP | 2004-100132 A | 4/2004 | |
| JP | 2013-49208 A | 3/2013 | |
| JP | 2014-30913 A | 2/2014 | |
| JP | 5512908 B1 | 4/2014 | |
| JP | 2016-160534 A | 9/2016 | |
| JP | 2017-218717 A | 12/2017 | |
| WO | 2016/104154 A1 | 6/2016 | |
| WO | 2017/111056 A1 | 6/2017 | |
| WO | WO-2017111056 A1 * | 6/2017 | ........... B29B 15/122 |
| WO | 2017/221655 A1 | 12/2017 | |
| WO | 2019/194090 A1 | 10/2019 | |

OTHER PUBLICATIONS

Extended European Search Report dated Jun. 13, 2023, of counterpart European Patent Application No. 19864138.3.

Notice of Reasons for Refusal dated Jun. 13, 2023, of counterpart Japanese Patent Application No. 2019-542235, along with an English translation.

* cited by examiner

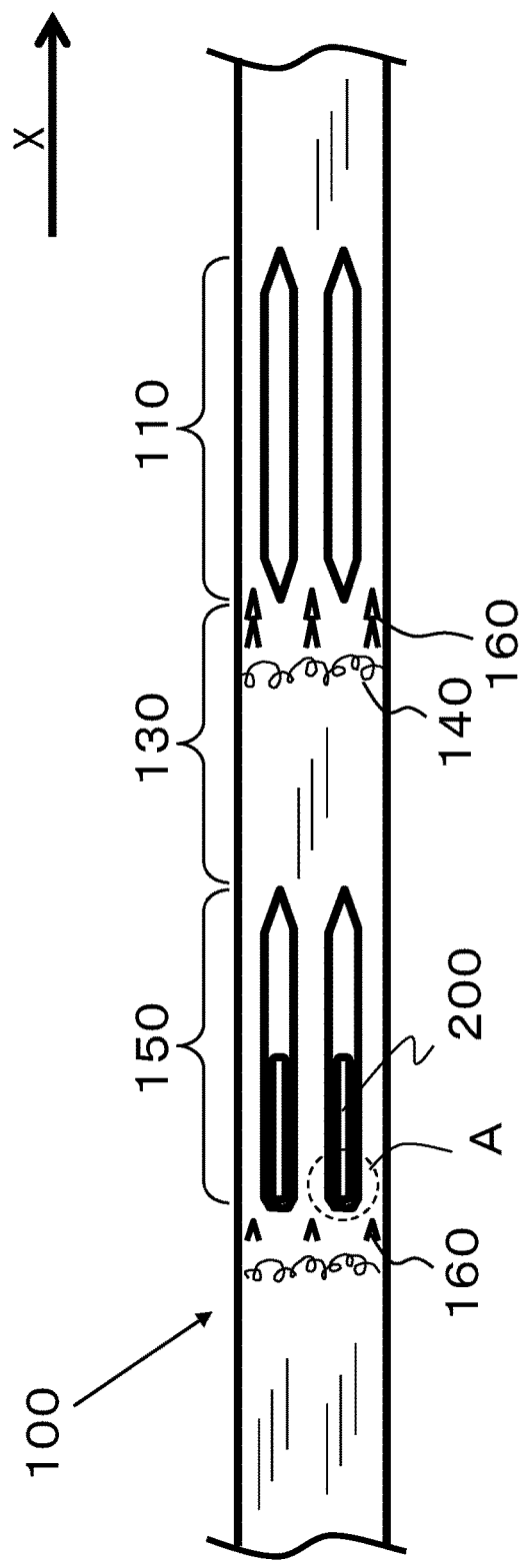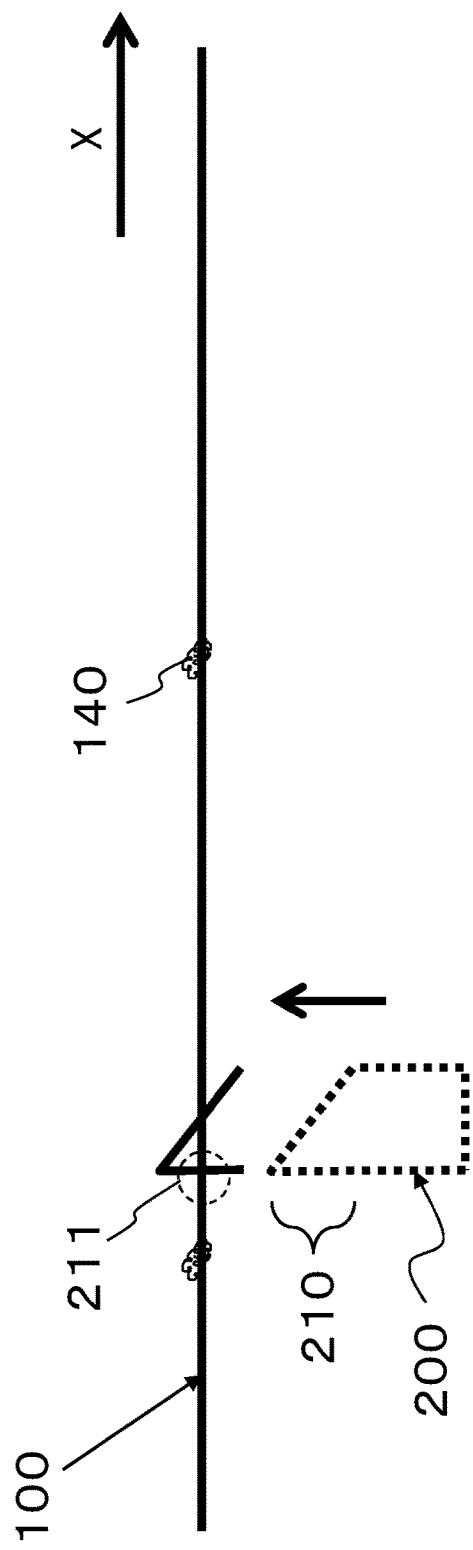

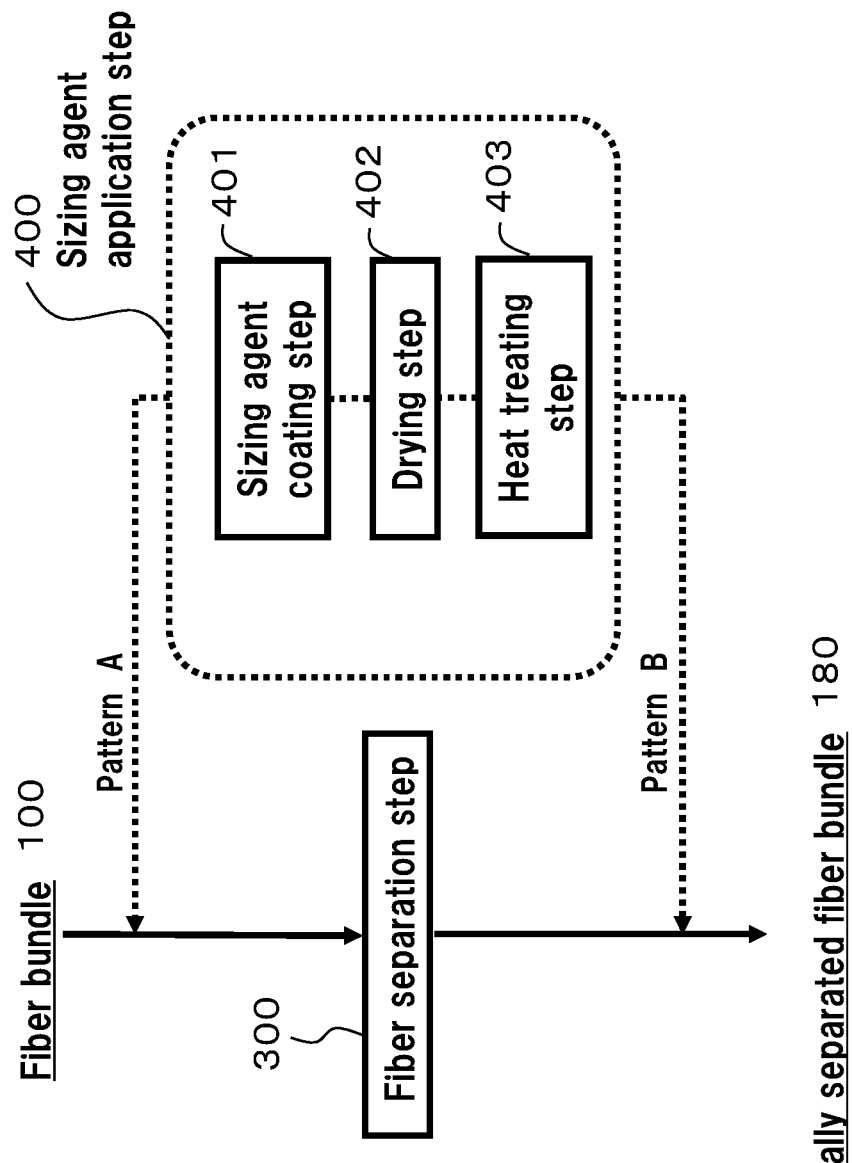

PARTIALLY SEPARATED FIBER BUNDLE AND METHOD OF MANUFACTURING SAME

TECHNICAL FIELD

This disclosure relates to a partially separated fiber bundle, more specifically, a partially separated fiber bundle having a separated fiber section that can be continuously obtained without causing yarn breakage from an inexpensive large tow with a large number of single yarns having not been intended for separation.

BACKGROUND

There has been known a technology for manufacturing a molded article with a desired shape by thermoforming or pressure molding with use of a molding material composed of a bundle aggregate (also sometimes referred to as fiber bundle) of discontinuous reinforcing fibers (carbon fibers, for example), and a matrix resin. In such a method, a molding material composed of a fiber bundle having a large number of single yarns, although excels in fluidity during molding, tends to demonstrate poor mechanical properties in the form of molded article. On the other hand, a fiber bundle with a freely adjustable number of single yarns has been used, with the aim of balancing between fluidity during molding and mechanical properties of the molded article.

Japanese Patent Laid-open Publication No. 2002-255448 and Japanese Patent Laid-open Publication No. 2004-100132, for example, disclose methods of separating a fiber bundle into a freely selectable number of single yarns by using a multiple fiber bundle wound article having a single bobbin on which a plurality of fiber bundles are preliminarily wound. However, those methods are restricted by the number of single yarns of the fiber bundle in preliminary process, causing limitation of adjustment range and difficulty in adjustment to a desired number of single yarns.

Meanwhile, Japanese Patent Laid-open Publication No. 2013-49208, Japanese Patent Laid-open Publication No. 2014-30913 and Japanese Patent No. 5512908, for example, disclose methods of longitudinally slitting a fiber bundle into a desired number of single yarns, by using a slitter. Those methods, although capable of adjusting the number of single yarns by changing the slit pitch, tends to suffer from difficult handling since the fiber bundle is longitudinally slit over the entire length in the longitudinal direction and this raises a need to wind up the thus longitudinally slit fiber bundles individually on separate bobbins, and in a subsequent process a need to unwind the fiber bundles individually from the plurality of wound bobbins. It is also anticipated that a large amount of fluff generated from the longitudinal slitting entangles around the guide roll, feed roll or the like, when the longitudinally slit fiber bundle is conveyed, making the conveyance difficult.

Further, International Patent Publication No. WO2016/104154 discloses a method of continuously providing separated fiber sections, by sticking a fiber separating device having a plurality of projections partially into the fiber bundle. The partially separated fiber bundle obtained by the method described therein, however, tends to cause large variation of width when cut, in a subsequent process, into a certain length to produce chopped fiber, leaving room to improve the mechanical properties of a fiber-reinforced resin molding material and a molded article to be manufactured.

It could therefore be helpful to provide a partially separated fiber bundle that can yield chopped fiber with more uniform width of separated fiber, and capable of composing a fiber-reinforced resin molding material having excellent mechanical properties, as well as to enable provision of a partially separated fiber bundle continuously over a long time, even from a fiber bundle containing twists, or from a large tow having a large number of single yarns.

SUMMARY

We thus provide:

[1] A partially separated fiber bundle that includes a separated fiber section and an unseparated fiber section, being configured to give a ratio $A_{max}/A_{min}$ of 1.1 or larger and 3 or smaller, when the number of fiber bundles contained in the width direction of the partially separated fiber bundle (fiber separating number: $N_n$ (units)), measured at a freely selected point $P_n$ (where, n represents an integer of 1 to 100, and freely selected points $P_n$ and $P_{n+1}$, excluding n=100, being 50 cm or more away from each other), is divided by a full width of $W_n$ (mm) of the partially separated fiber bundle, to calculate the fiber separating number per unit width $A_n$ (units/mm), and assuming its maximum value as $A_{max}$ (units/mm) and its minimum value as $A_{min}$ (units/mm).

[2] The partially separated fiber bundle according to [1], in which the maximum value $A_{max}$ is 4 units/mm or smaller.

[3] The partially separated fiber bundle according to [1] or [2], in which the minimum value $A_{min}$ is 0.1 units/mm or larger.

[4] The partially separated fiber bundle according to any one of [1] to [3], in which there are 50 or more, out of 100, measured points $P_n$ at which 80% or more of the maximum value $A_{max}$ is attained.

[5] The partially separated fiber bundle according to any one of [1] to [4], in which there are 30 or less, out of 100, measured points $P_n$ at which 60% or less of the maximum value $A_{max}$ is attained.

[6] The partially separated fiber bundle according to any one of [1] to [5], in which the fiber bundle is composed of carbon fibers.

[7] The partially separated fiber bundle according to any one of [1] to [6], in which the fiber bundle contains a sizing agent that contains an epoxy resin as a main component, or a sizing agent that contains a polyamide resin as a main component, an adhesion amounts of the sizing agent being 0.1% by mass or more and 5% by mass or less.

[8] A method of manufacturing a partially separated fiber bundle, by which a fiber bundle that contains a plurality of single yarns is allowed to travel in the longitudinal direction, and a fiber separating device is intermittently stuck into the fiber bundle to form a separated fiber section and an unseparated fiber section in the fiber bundle, the fiber separating device being stuck at a plurality of points in the width direction of the fiber bundle while being shifted in the longitudinal direction to adjust a ratio $A_{max}/A_{min}$ to 1.1 or larger and 3 or smaller, when the number of fiber bundles contained in the width direction of the partially separated fiber bundle (fiber separating number: $N_n$ (units)) measured at a freely selected point $P_n$, wherein n represents an integer of 1 to 100, and freely selected points $P_n$ and $P_{n+1}$, excluding n=100, being 50 cm or more away from each other, is divided by a full width of $W_n$ (mm) of the partially separated fiber bundle, to determine the fiber separating number per unit width $A_n$ (units/mm), and assuming its maximum value as $A_{max}$ (units/mm) and its minimum value as $A_{min}$ (units/mm).

[9] The method of manufacturing a partially separated fiber bundle according to [8], in which the fiber separating device is stuck at a plurality of points in the width direction of the fiber bundle while being shifted in the longitudinal direction, by using a fiber separating device having a plurality of projections arranged at points corresponding to the plurality of points in the width direction while being shifted in the longitudinal direction, so as to stick the plurality of projections at the same time into the fiber bundle.

[10] The method of manufacturing a partially separated fiber bundle according to [8] or [9], in which the fiber separating device is stuck at points in the width direction of the fiber bundle, the number of points ranging from (F/10000−1) or more up to less than (F/50−1), where F is the number of single yarns composing the fiber bundle.

[11] The method of manufacturing a partially separated fiber bundle according to any one of [8] to [10], further including sizing agent applying step, drying step, heat treating step, and fiber bundle widening step.

It becomes possible to provide a partially separated fiber bundle which can yield chopped fiber with more uniform width of separated fiber, and capable of composing a fiber-reinforced resin molding material having excellent mechanical properties. It also becomes possible to provide a partially separated fiber bundle continuously over a long time, even from a fiber bundle containing twists, or from a large tow having a large number of single yarns.

BRIEF DESCRIPTION OF THE DRAWINGS

FIGS. 2A and 2B are diagrams illustrating an exemplary process of manufacturing a partially separated fiber bundle by subjecting a fiber bundle to fiber separation, including FIG. 2A schematic plan view, and FIG. 2B schematic front elevation view.

FIG. 9 is a process chart illustrating exemplary timing of a sizing agent application step, in the method of manufacturing a partially separated fiber bundle.

DESCRIPTION OF REFERENCE SIGNS

Figure 1:
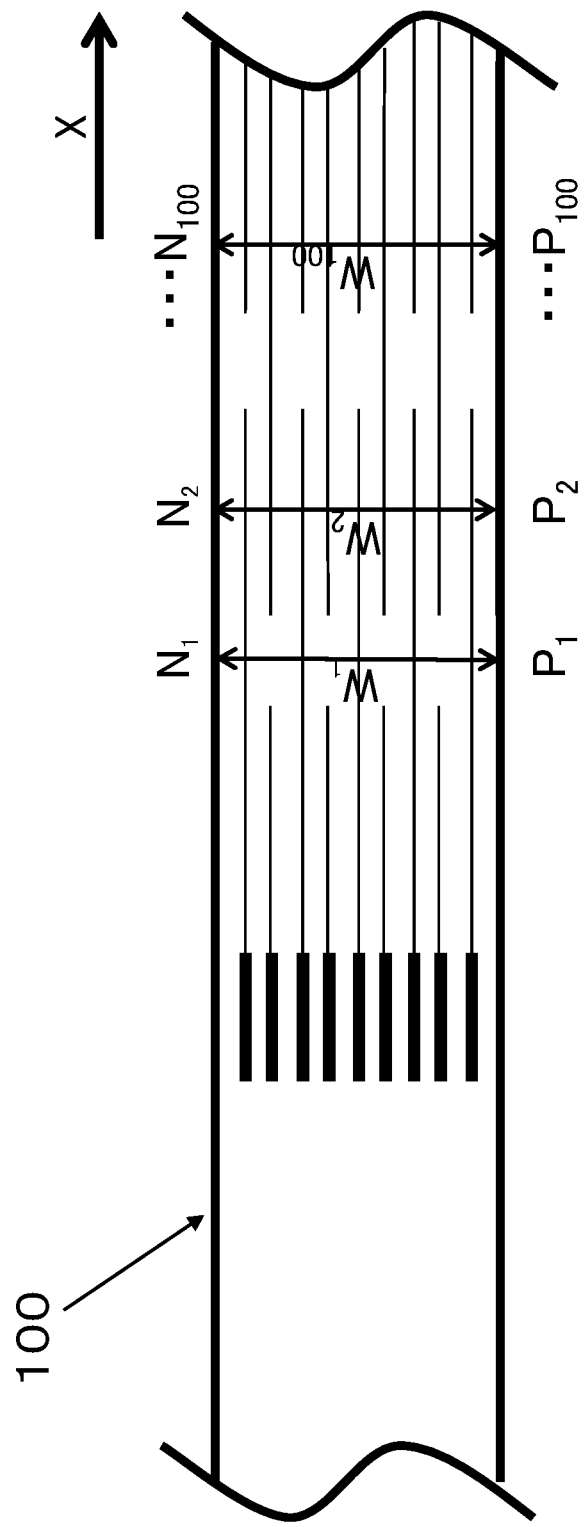
FIG. 1 is a schematic view illustrating a method of measuring the fiber separating number in a partially separated fiber bundle.

100: Fiber bundle
110: Separated fiber section
130: Unseparated fiber section
140: Fluff accumulation
150: Separated fiber section
160: Entangled section
200: Fiber separating device
210: Projection
211: Contact part

DETAILED DESCRIPTION

We provide a partially separated fiber bundle that includes a separated fiber section and an unseparated fiber section, being configured to give a ratio $A_{max}/A_{min}$ of 1.1 or larger and 3 or smaller, when the number of fiber bundles contained in the width direction of the partially separated fiber bundle (fiber separating number: $N_n$ (units)), measured at a freely selected point $P_n$, wherein n represents an integer of 1 to 100, and freely selected points $P_n$ and $P_{n+1}$, excluding n=100, being 50 cm or more away from each other, is divided by a full width of $W_n$ [mm] of the partially separated fiber bundle, to calculate the fiber separating number per unit width $A_n$ (units/mm), and assuming its maximum value as $A_{max}$ (units/mm) and its minimum value as $A_{min}$ (units/mm).

The partially separated fiber bundle includes the separated fiber section having slits in the direction of fiber orientation (longitudinal direction) and an unseparated fiber section having no slits in which in a site of fiber separation, the fiber separation occurs intermittently rather than continuously in the longitudinal direction of the fiber bundle, while leaving the unseparated fiber section on the extension of the slit in the separated fiber section.

The partially separated fiber bundle has a fiber separating number per unit width $A_n$ (units/mm) following the aforementioned relationship, where the fiber separating number $A_n$ and so forth is derived as follows. That is, as illustrated in FIG. 1, the number of fiber bundles contained in the width direction of the partially separated fiber bundle (fiber separating number: $N_n$ (units)) measured at a freely selected point $P_n$ is divided by a full width of ($W_n$ (mm)) of the partially separated fiber bundle, to calculate the fiber separating number per unit width $A_n$ (units/mm), and next, the fiber separating number per unit width $A_{n+1}$ measured at point $P_{n+1}$ 50 cm or more away from the aforementioned freely selected point is calculated. This measurement is repeated over the range of n=1 to 100, wherein n is an integer), that is, repeated at 100 points, and the fiber separating number per unit width ($A_1$ to $A_{100}$) are individually calculated. Next, the ratio $A_{max}/A_{min}$ of the maximum value $A_{max}$ (units/mm) and the minimum value $A_{min}$ (units/mm), found from among the fiber separating number per unit width ($A_1$ to $A_{100}$) calculated at 100 points, is calculated.

The lower limit value of ratio $A_{max}/A_{min}$ of the maximum value $A_{max}$ (units/mm) to the minimum value $A_{min}$ (units/mm) is essentially 1.1 or above, preferably 1.3 or above, and more preferably 1.5 or above. With the ratio $A_{max}/A_{min}$ of the maximum value $A_{max}$ (units/mm) and the minimum value $A_{min}$ (units/mm) controlled to these ranges, the blades will not always be kept stuck in the bundle, making it possible to suppress fluffing, and elongate replacement intervals of the slitting blades. On the other hand, the upper limit value of ratio $A_{max}/A_{min}$ of the maximum value $A_{max}$ (units/mm) and the minimum value $A_{min}$ (units/mm) is essentially 3 or below, preferably 2.5 or below, and more preferably 2 or below. With the ratio $A_{max}/A_{min}$ of the maximum value $A_{max}$ (units/mm) and the minimum value $A_{min}$ (units/mm) controlled to these ranges, the separated fiber sections will be provided more evenly in the longitudinal direction of the fiber bundle so that an obtainable chopped fiber cut from the partially separated fiber bundle into a certain length, will have more uniform width of separated fibers, and obtainable molded article will have smaller variation in mechanical properties.

The maximum value $A_{max}$, found from among the fiber separating numbers ($A_1$ to $A_{100}$) measured at 100 points in the partially separated fiber bundle, is preferably 4 units/mm or below, more preferably 3.5 units/mm or below, and even more preferably 3 units/mm or below. With the maximum value $A_{max}$ of the fiber separating number to be controlled to this range, the fiber separating device will be easily stuck into the fiber bundle, and the separated fiber sections will be more evenly provided in the fiber bundle so that the thus obtained partially separated fiber bundle when made into chopped fibers and contained in the molded article, will be able to further enhance the mechanical properties of the molded article.

The minimum value of the fiber separating number $A_{min}$ is preferably 0.1 units/mm or above, more preferably 0.3 units/mm or above, and even more preferably 0.5 units/mm or above. With the minimum value of the fiber separating number $A_{min}$ controlled within these ranges, the fiber bundle can be more finely separated, enabling the fiber separation to produce the chopped fibers with more constant width of separated fiber, and the obtainable molded article will have further improved mechanical properties.

From the viewpoint of making the chopped fibers and then obtaining the molded article with high mechanical properties, a larger value is basically preferred for each fiber separating number $A_n$. It is therefore preferable that there are 50 or more, out of 100, measured points at which the fiber separating number $A_n$ accounts for 80% or more of the maximum value $A_{max}$, more preferably there are 60 or points, and even more preferably there are 70 or more points. If the number of measurement points, at which the fiber separating number $A_n$ accounts for 80% or more of the maximum value $A_{max}$, is controlled to these ranges, the fiber separation can produce the chopped fibers with more constant width so that the obtainable molded article with use of the chopped fibers will have further improved mechanical properties and less variation in mechanical characteristics.

From the same point of view, the number of measurement points, at which the fiber separating number $A_n$ accounts for 60% or less of the maximum value $A_{max}$, is preferably 30 or less, out of 100, more preferably 20 or less, and even more preferably 10 or less. If the number of measurement points, at which 60% or less of the maximum value $A_{max}$ is attained, is controlled to these ranges, the fiber separation can produce the chopped fibers with more constant width so that the obtainable molded article with use of the chopped fibers will have further improved mechanical properties and less variation in mechanical characteristics.

The fiber bundle is used as a reinforcing fiber in which type of the reinforcing fiber is not particularly limited so long as it is a fiber bundle composed of a plurality of single yarns, for which preferred are fibers selected from the group consisting of carbon fiber, glass fiber, aramid fiber and metal fiber. Of these, carbon fiber is preferably used. The carbon fiber is not particularly limited, for which polyacrylonitrile (PAN)-based, pitch-based, and rayon-based carbon fibers can be preferably used from the viewpoint of improving mechanical properties and reducing the weight of the fiber reinforced resin. One type of them may be used, or two or more types may be used in a combined manner. Above all, PAN-based carbon fiber is preferably used, from the viewpoint of balance between the strength and elastic modulus of the obtainable fiber-reinforced resin.

Diameter of a single fiber of the reinforcing fiber contained in the reinforcing fiber bundle is preferably 0.5 μm or larger, more preferably 2 μm or larger, and even more preferably 4 μm or larger. The diameter of a single fiber of the reinforcing fiber is preferably 20 μm or smaller, more preferably 15 μm or smaller, and even more preferably 10 μm or smaller.

Strand strength of the reinforcing fiber bundle is preferably 3.0 GPa or larger, more preferably 4.0 GPa or larger, and even more preferably 4.5 GPa or larger. Strand elastic modulus of the reinforcing fiber bundle is preferably 200 GPa or larger, more preferably 220 GPa or larger, and even more preferably 240 GPa or larger. With the strand strength or the elastic modulus of the reinforcing fiber bundle individually controlled to these ranges, the mechanical properties of the molded article can be enhanced.

The carbon fiber is usually sized to yield a fiber bundle containing approximately 3000 to 60,000 single yarns made of continuous fibers, wound on a bobbin, and marketed in the form of wound body (package). The fiber bundle, although preferably untwisted, may be made of twisted strands in which even those got twisted during transportation may be applicable. There is no restriction on the number of single yarns, and use of a so-called large tow having a large number of single yarns and therefore having a low price per unit weight of fiber bundle is advantageous since the larger the number of single yarns, the lower the cost of the final product. The large tow may alternatively be used in the form of so-called combined yarn in which a plurality of fiber bundles are combined into a single bundle and wound up.

The partially separated fiber bundle preferably has a sizing agent applied thereto. Type of solute of the sizing agent is not particularly limited, where applicable compounds include those having a functional group such as epoxy group, urethane group, amino group, carboxy group and the like. A sizing agent that contains epoxy resin as a main component, or a sizing agent that contains polyamide resin as a main component is preferably used. They may be used alone or in combination of two or more. The reinforcing fiber bundle, to which the sizing agent is already applied, may be further treated with another different type of sizing agent. The main component means a component that accounts for 70% by weight or more of the solute component.

Types of the epoxy resin include bisphenol A type epoxy resin, bisphenol F type epoxy resin, novolac type epoxy resin, aliphatic type epoxy resin, and glycidylamine type epoxy resin, all of which may be used alone, or two more types may be used in a combined manner.

For the polyamide resin, preferably used is a water-soluble polyamide resin. For example, the water-soluble polyamide may be a polyamide resin obtainable by polycondensing a diamine having a tertiary amino group and/or an oxyethylene group in the principal chain, with a carboxylic acid, in which the diamine useful here includes monomers having a piperazine ring and a tertiary amino group in the principal chain such as N,N'-bis(γ-aminopropyl)piperazine and N-(β-aminoethyl)piperazine; and alkyldiamines having an oxyethylene group in the principal chain, such as oxyethylene alkyl amine. The dicarboxylic acid usable here includes adipic acid and sebacic acid.

The sizing agent using the water-soluble polyamide resin excels in affinity with various matrix materials, and remarkably improves physical properties of the composite, in which particularly large effects of improving adhesiveness are demonstrated on matrix materials that contain polyamide-based resin, polyimide-based resin, polyamide-imide-based resin, and polyetheramide-imide resin.

The water-soluble polyamide may be a copolymer. Examples of the copolymerization component include lactams such as α-pyrrolidone, α-piperidone, ε-caprolactam, α-methyl-6-caprolactam, ε-methyl-ε-caprolactam, and ε-laurolactam. Also binary copolymerization or multiple copolymerization is acceptable, in which ratio of copolymerization is determined without interfering physical properties represented by water solubility. The ratio of copolymerization of a component having a lactam ring is preferably controlled within the range of 30% by weight or below, otherwise the polymer will not be completely soluble to water.

Even poorly water-soluble polymers having the ratio of copolymerization of a component out of the aforementioned range may, however, have increased solubility and may become water soluble, if the solution is acidified with use of an organic or inorganic acid. Examples of the organic acid include: acetic acid, chloroacetic acid, propionic acid, maleic acid, oxalic acid and fluoroacetic acid. Meanwhile, examples of the inorganic acid include well-known mineral acid such as hydrochloric acid, sulfuric acid and phosphoric acid.

Upper limit of the adhesion amount of the sizing agent is preferably 5% by mass or below assuming the mass of the reinforcing fiber bundle (partially separated fiber bundle to be obtained finally) as 100% by mass, which is more preferably 4% by mass or below, and even more preferably 3% by mass or below. With the adhesion amount of the sizing agent exceeding 5% by mass, the fiber bundle would lose flexibility and become too hard, possibly failing to wind onto or unwind from the bobbin smoothly. It is also anticipated that the fiber separating device cannot be stuck into the fiber bundle during fiber separation, possibly leaving the unseparated fiber section.

Meanwhile, lower limit of the adhesion amount of the sizing agent is preferably 0.1% by mass or above, more preferably 0.3% by mass or above, and even more preferably 0.5% by mass or above. With the adhesion amount of the sizing agent controlled within these ranges, obtainable is an effect of suppressing interlaced part where the single yarns are interlaced, advantageously improving productivity and quality of the partially separated fiber bundle. Moreover, the fiber bundle, when cut, may be suppressed from being split or unsized into single yarns, thus improving retainability of a predetermined bundle form. That is, it becomes possible to narrow distribution of the number of single yarns that compose the chopped fiber bundle, and obtain a uniform and optimally-shaped chopped fiber bundle. This makes it possible to improve the mechanical properties of the molded article, and reduce variation in the mechanical properties. How to derive the adhesion amount of the sizing agent will be described later.

Next, a method of manufacturing a partially separated fiber bundle will be specifically explained, with reference to examples. Our partially separated fiber bundle is not construed as being limited to the specific aspects disclosed below.

The partially separated fiber bundle is obtained through steps of unwinding the fiber bundle from an unwinding device or the like, widening the fiber bundle as necessary, followed by fiber separation. Each of these steps will be detailed below.

First, unwinding of the fiber bundle will be explained. A fiber bundle composed of a plurality of single yarns is unwound from an unwinding device for unwinding the fiber bundle or the like, arranged on the upstream side in the travel direction of the fiber bundle. The direction of unwinding the fiber bundle is available both in the side-out system in which the fiber bundle is unwound in the direction perpendicular to the rotational axis of bobbin, and in the vertical-out system in which the fiber bundle is unwound in the same direction as the rotational axis of bobbin (paper tube), in which the side-out system is preferred considering that untwisting would be less likely to occur.

The bobbin during unwinding can be installed in any direction. Above all, when the bobbin is stuck on a creel, with an end face of the bobbin, opposite to the end face fixed to the rotational axis of creel, oriented to any direction but not horizontally, the fiber bundle is preferably held under a certain level of tension. The fiber bundle, if not kept under a certain tension, would slip off the package (wound article having a bobbin and a fiber bundle wound thereon) and separate from the package, or the fiber bundle separated from the package would entangle around the rotational axis of the creel, possibly making unwinding difficult.

As a method of fixing the rotational axis of unwinding package, other than the method of using the creel, applicable is a surface unwinding system in which the package is placed on, and in parallel to, two rollers arranged in parallel, and the package is allowed to roll on the adjacent rollers to unwind the fiber bundle.

In unwinding with the use of a creel, another possible method is to hang a belt on the creel, with one end fixed, and with the other end pulled by hanging a weight or with a spring to brake the creel, thereby applying tension to the fiber bundle to be unwound. In this instance, varying the braking force depending on the diameter of winding will provide an effective means of stabilizing the tension.

Next, the steps of widening and fiber separation will be explained. The processes below are not always necessarily carried out under constant conditions. Instead, it is possible to allow variation of width of winding at a certain periodicity or at a desired point.

In the widening step, for example, the fiber bundle in motion after unwound as described previously is blown with compressed air, or the fiber bundle is allowed to pass through vibrating widening rolls that vibrate in the axial direction, and then through width-limiting rolls to be widened to a desired width.

In the fiber separation process, a fiber separation blade is intermittently stuck into the widened fiber bundle to partially form a separated fiber section in the reinforcing fiber bundle. FIGS. 2A and 2B illustrate an exemplary process of fiber separation made in the fiber bundle. FIG. 2A represents a schematic plan view, and FIG. 2B represents a schematic front elevation in which a fiber bundle 100 composed of a plurality of single yarns travels from the left (upstream side) to the right (downstream side) of the drawings. Fiber bundle travel direction X (arrow) in the drawing represents the longitudinal direction of the fiber bundle 100, indicating that the fiber bundle 100 is continuously fed from an unillustrated fiber bundle feeder.

The fiber separating device 200 is equipped with a projection 210 (separation blade) having a protruding shape that can be easily stuck into the fiber bundle 100, being designed to stick the projection 210 into the fiber bundle 100 in motion to produce a separated fiber section 150 (in the midst of fiber separation) that extends nearly in parallel to the longitudinal direction of the fiber bundle 100. Although, in our method, the projections of the fiber separating device that are to be stuck at a plurality of points in the width direction of the fiber bundle need be stuck in a phase-shifted manner in the longitudinal direction of the fiber bundle, FIGS. 2A and 2B are intended to explain only action of the projections that are stuck in a phase-matched manner, while omitting other projections that are stuck in a phase-shifted manner.

As illustrated in FIG. 2B, the fiber separating device 200 is preferably stuck in the direction along the side surface of the fiber bundle 100. Assuming the cross section of the fiber bundle has a flat shape such as horizontal ellipse or horizontally long rectangle, the side face of the fiber bundle means a vertical face that appears at the end of a cross section of the fiber bundle (corresponded to the side face of the fiber bundle 100 illustrated in FIG. 1, for example).

The fiber separating device 200 has a plurality of projections 210 arranged in the width direction of the fiber bundle 100, and is necessarily driven to stick the projections 210 into the fiber bundle in a phase-shifted manner in the fiber bundle travel direction X, in which the number of projections 210 owned by a single fiber separating device 200 is not particularly limited, allowing one, or a plurality of projections 210 per fiber separating device 200. Alternatively, there may be a plurality of fiber separating devices 200 having a single projection 210. When there are a plurality of projections 210 in one fiber separating device 200, each of the projections 210 will have reduced amount of wear per unit time, also making it possible to reduce the frequency of replacement of the fiber separating device. It is also acceptable to use a plurality of fiber separating devices 200 at the same time, depending on the number of fiber bundles to be separated. Such plurality of fiber separating devices 200 may be arranged in parallel, staggered, or in a phase-shifted manner to freely arrange the plurality of projections 210.

The plurality of single yarns composing the fiber bundle 100 are not substantially paralleled within the fiber bundle 100, but have a lot of points where the single yarns are interlaced (crossed/entangled). Hence, when separating the fiber bundle 100 composed of a plurality of single yarns into fiber bundles with less number of yarns by using the fiber separating device 200, an entangled section 160 may be formed during the fiber separation in the vicinity of a contact part 211 between the fiber bundle 100 and the fiber separating device 200. "An entangled section 160 may be formed" exemplifies when entanglement among the single yarns, having resided within a range of fiber separation, is formed (moved) into the contact part 211 by the fiber separating device 200, or when a new aggregate of interlaced single yarns is formed (created) by the fiber separating device 200.

After forming the separated fiber section 150 over a freely selectable range, the fiber separating device 200 is removed from the fiber bundle 100. Upon removal, a separated fiber section 110 having gone through the fiber separation is produced and, concurrently, the thus produced entangled section 160 is accumulated at the end part of the separated fiber section 110. Fluff generated from the fiber bundle during the fiber separation will form a fluff accumulation 140.

After travel of the fiber bundle over a desired length, the fiber separating device 200 is again stuck into the fiber bundle 100 to leave an unseparated fiber section 130 behind, thereby forming a partially separated fiber bundle having the separated fiber section 110 and the unseparated fiber section 130 arranged alternately in the longitudinal direction of the fiber bundle 100, at a certain point in the width direction of the fiber bundle.

Travel speed of the fiber bundle 100 during the fiber separation is preferably stable with less fluctuation, and more preferably is constant.

Although not illustrated in FIGS. 2A and 2B, when sticking the plurality of projections in the width direction of the fiber bundle in the aforementioned fiber separation, such plurality of projections are stuck into the fiber bundle in a phase-shifted manner in the longitudinal direction.

Figure 4A:
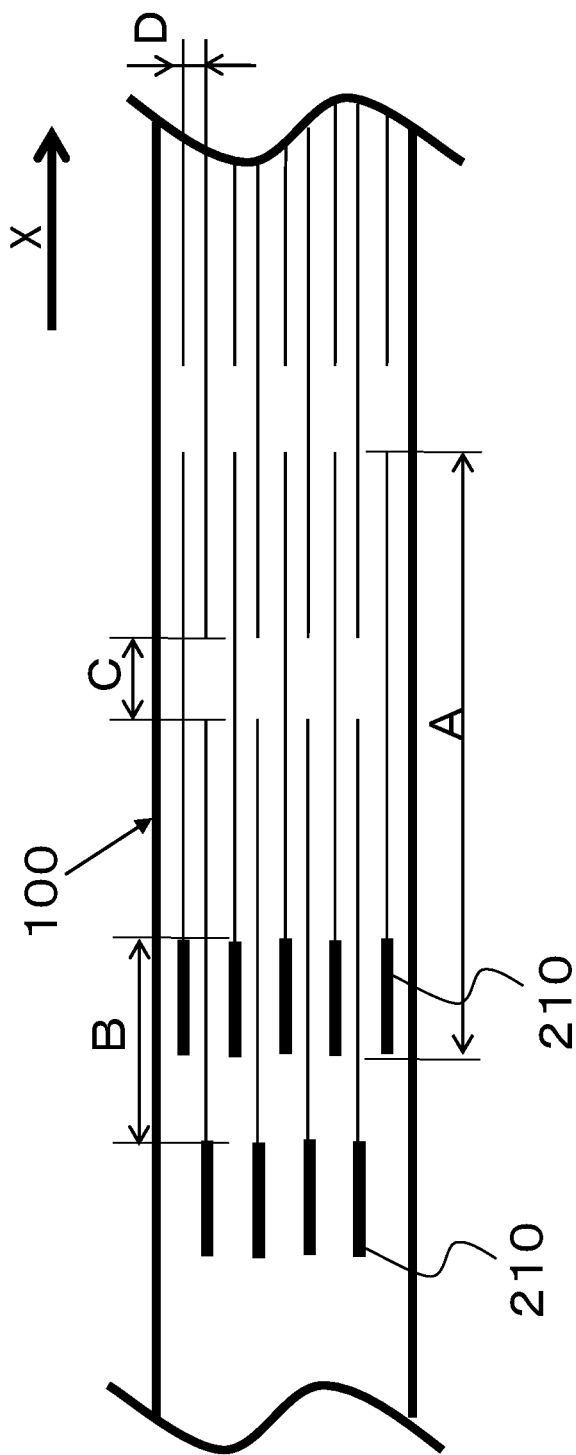
FIGS. 4A and 4B are schematic views illustrating a rotary fiber separating device having projections in staggered arrangement, stuck into a fiber bundle, including FIG. 4A schematic plan view and FIG. 4B schematic front elevation view.
Figure 4B:
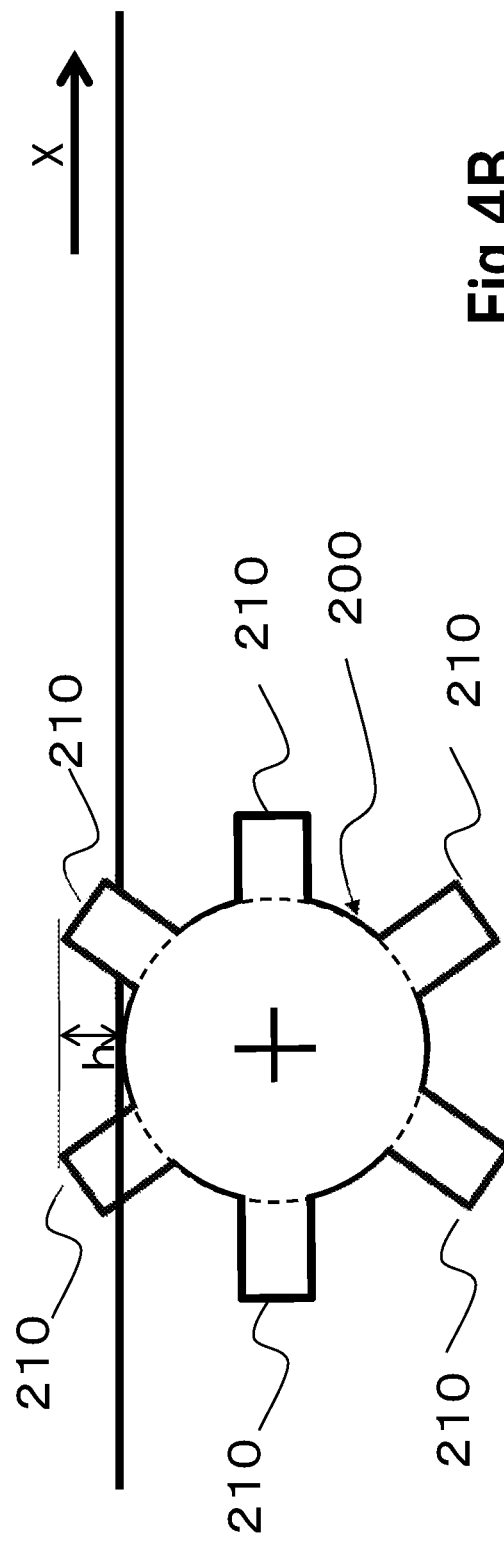

The fiber separating device 200 is not particularly limited so long as the desired effect can be achieved, and is preferably provided with a sharply shaped projection 210 such as metal needle or thin plate. Specifically, preferred is a rotary blade (fiber separating device 200) having a plurality of projections 210 (blades) arranged in a phase-shifted manner in the direction of rotational axis as illustrated in FIGS. 4A and 4B; or a fiber separating device 200 having a plurality of vertical blades (projections) to be stuck into the fiber bundle in a phase-shifted manner as illustrated in FIGS. 5A to 7B.

Lower limit of height h of the projection above the surface of the fiber bundle is preferably 5 mm or above, more preferably 7 mm or above, and even more preferably 10 mm or above. Meanwhile, upper limit of the height h of the projection above the surface of the fiber bundle is preferably 50 mm or below, more preferably 35 mm or below, and even more preferably 40 mm or below. With the height h of the projection controlled within these ranges, the fiber separating device can be downsized and separate the fiber bundle more stably. Direction of sticking the projections of the fiber separating device into the fiber bundle may be oblique to the fiber bundle, or may be either from the front or the back of the fiber bundle.

Figure 3:
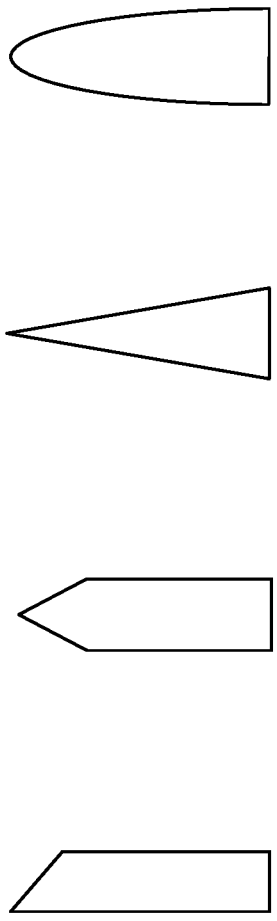
FIG. 3 is an explanatory diagram illustrating exemplary shapes of a projection of a fiber separating device.

The end shape of the projection 210 is preferably as illustrated in FIG. 3, although not particularly limited so long as it is allowed for sticking. Projections with sharp ends ($2a1$ to $2a3$) have good sticking properties, meanwhile projections with rounded ends ($2a4$ to $2a6$) can prevent the single yarn from being broken, causing less fluffing. Projections ($2a7$, $2a8$) are particularly improved in sticking property when employed in a rotary fiber separating device.

There are required a plurality of projections 210 arranged in the width direction of the fiber bundle 100 to be separated, in which the number thereof is freely selectable depending on the number of single yarns F (fibers) that compose the fiber bundle 100 to be separated. The number of projections 210, in the width direction of the fiber bundle 100, is preferably (F/10000−1) or larger and smaller than (F/50−1). With the number controlled smaller than (F/10000−1), the mechanical properties will be less likely to improve when the fiber bundle is used to compose a reinforcing fiber composite material in the subsequent process, meanwhile with the value exceeding (F/50−1), there will be a risk of yarn breakage or fluffing.

Separation interval is adjustable on the basis of pitch of the plurality of projections arranged side by side in the width direction of the fiber bundle. By reducing the pitch of the projections and by thus providing a larger number of projections in the width direction of the fiber bundle, the fiber separation will be able to produce a bundle having a less number of single yarns, which is a so-called fine bundle. The lower limit of gap between the projections (referred to as width of separated fiber, hereinafter) to form the fine bundle is preferably 0.1 mm or above, and more preferably 0.2 mm or above. Meanwhile, the upper limit for the width of separated fiber is preferably 10 mm or below. With the width of separated fiber set narrower than 0.1 mm, the fiber separating devices would meander in the travel direction due to fluffs, and the projections would be brought into mutual contact to damage the fiber separating devices. On the other hand, with the width of separated fiber exceeding 10 mm, the fiber separating devices would not be brought into mutual contact, but the travel direction thereof would meander due to fluffing or interlaced single yarns, possibly making it difficult to attain a constant width of separated fiber. Further, the resultant molded article would have reduced demonstration of mechanical properties.

Next, the fiber separating device having a plurality of projections will be explained with reference to FIGS. 4A to 7B.

Figure 5A:
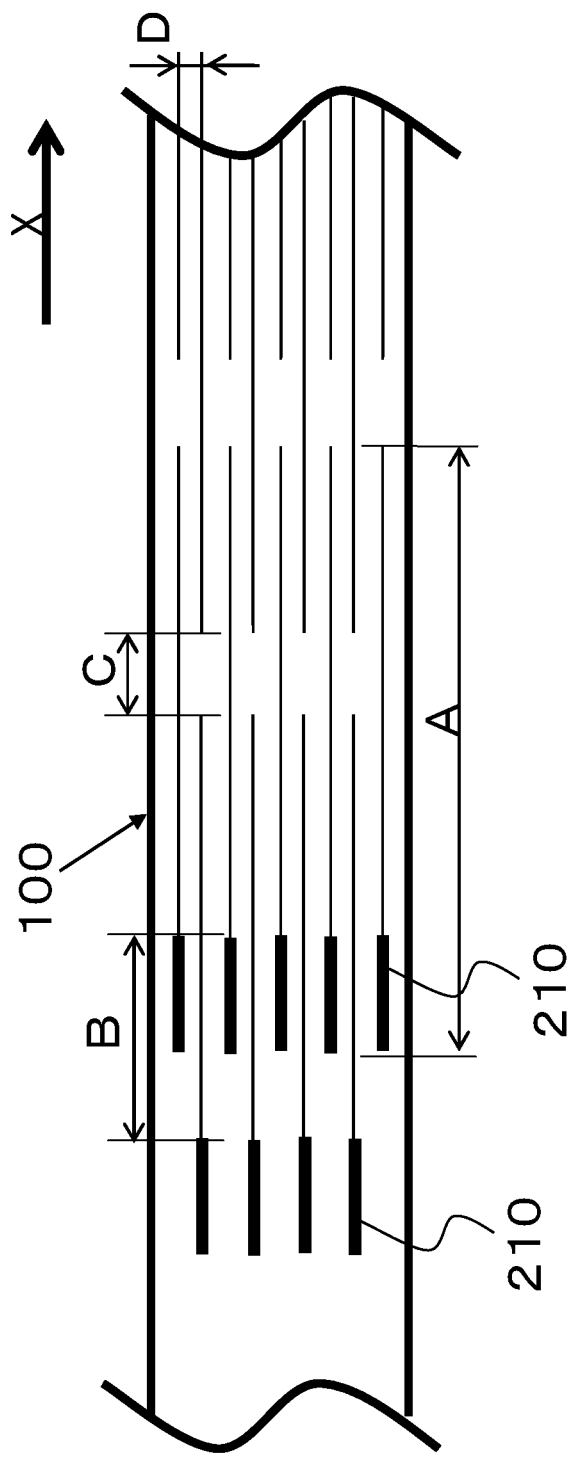
FIGS. 5A and 5B are schematic views illustrating a fiber separating device having a plurality of vertical blades in staggered arrangement stuck into a fiber bundle, including FIG. 5A schematic plan view, and FIG. 5B schematic front elevation view.
Figure 5B:
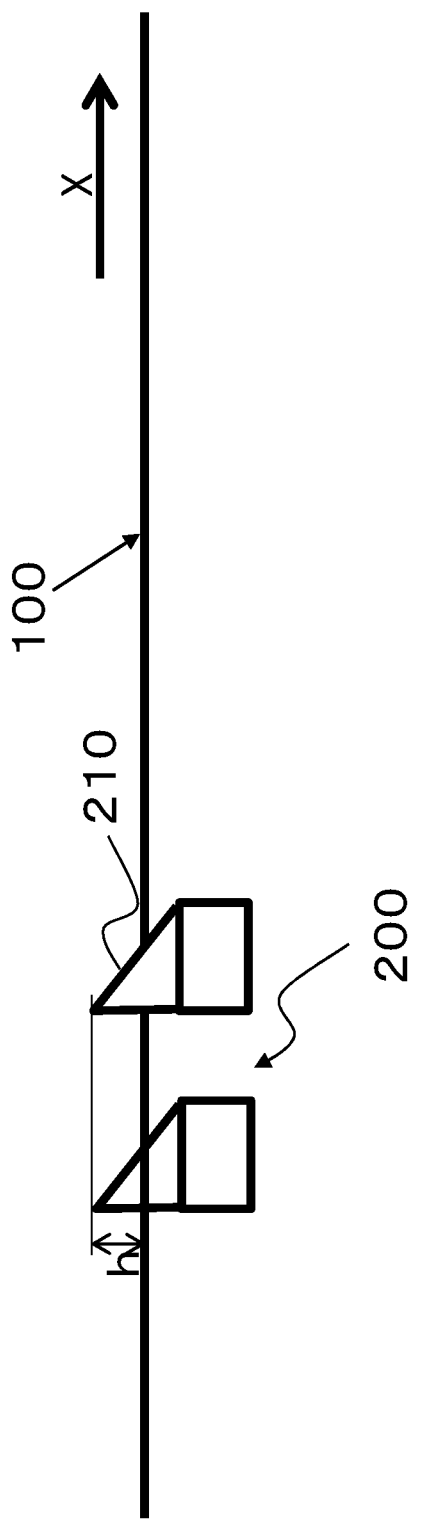

FIGS. 4A to 5B illustrate a configuration in which positions of the plurality of projections 210 in the fiber separating device are shifted between the upstream side and the downstream side of the fiber bundle 100; and in which two or more projections 210 arranged in the longitudinal direction of the fiber bundle are stuck into the fiber bundle all at once in a single run of the fiber separation. FIGS. 4A and 4B illustrate a rotary blade (fiber separating device 200) having a plurality of projections 210 (blades), and FIGS. 5A and 5B illustrate the fiber separating device 200 having a plurality of vertical blades (projections 210). By thus arranging the projections in a staggered manner, that is, by arranging the projections at points corresponding to a plurality of points in the width direction of the fiber bundle while shifting them in the longitudinal direction, it now becomes possible to stick the plurality of projections into the fiber bundle all at once and, consequently, to manufacture the partially separated fiber bundle which is suppressed in fluffing, and to yield chopped fibers with a relatively uniform width of separated fiber. The plurality of projections to be stuck into the fiber bundle in this situation may only be shifted in the longitudinal direction so that such plurality of projections are not always necessarily arranged on a single fiber separating device.

Length A (mm) of the separated fiber section ascribed to each projection is preferably 30 mm or longer and 1500 mm or shorter, distance B (mm) between the adjacent projections on the upstream side and the downstream side is preferably 20 mm or longer and 1500 mm or shorter, and length C (mm) of the unseparated fiber section ascribed to the individual projections is preferably 1 mm or longer and 150 mm or shorter. Distance D between loci of fiber separation ascribed to the adjacent projections on the upstream side and the downstream side is preferably 0.01 mm or longer and 5 mm or shorter. Within this range, load on the fiber separating device may be reduced, making it possible to manufacture the partially separated fiber bundle having a relatively uniform fiber separating number in the width direction of the bundle.

When the points of the adjacent projections 210 are differentiated between the upstream side and the downstream side of the fiber bundle 100 as illustrated in FIGS. 4A to 5B, it is preferable to adjust ratio of the number of projections arranged on the upstream side and the number of projections arranged on the downstream side (the larger number of arrangement of projections comes in the numerator, and the smaller number of arrangement of projections comes in the denominator) to 1 or larger and 2.5 or smaller, more preferably 1 or larger and 2 or smaller, and even more preferably 1 or larger and 1.5 or smaller. With the ratio of the number of projections arranged on the upstream side and the number of projections arranged on the downstream side adjusted within these ranges, the width of separated fiber will be made uniform, and the resultant molded article will have small variation in mechanical properties.

When arranging the points of the adjacent projections while being differentiated between the upstream side and the downstream side of the fiber bundle, it is preferable that there is at least one point where the arrangement interval of the projections in the direction orthogonal to the longitudinal direction of the fiber bundle, the projections being arranged on the upstream side of the fiber bundle, and the arrangement interval of the projections in the direction orthogonal to the longitudinal direction of the fiber bundle, the projections being arranged on the downstream side of the fiber bundle, become identical; and that the projections to be arranged on the upstream side and the projections to be arranged on the downstream side are positioned alternately and at the same intervals in the width direction of the fiber bundle.

Figure 6A:
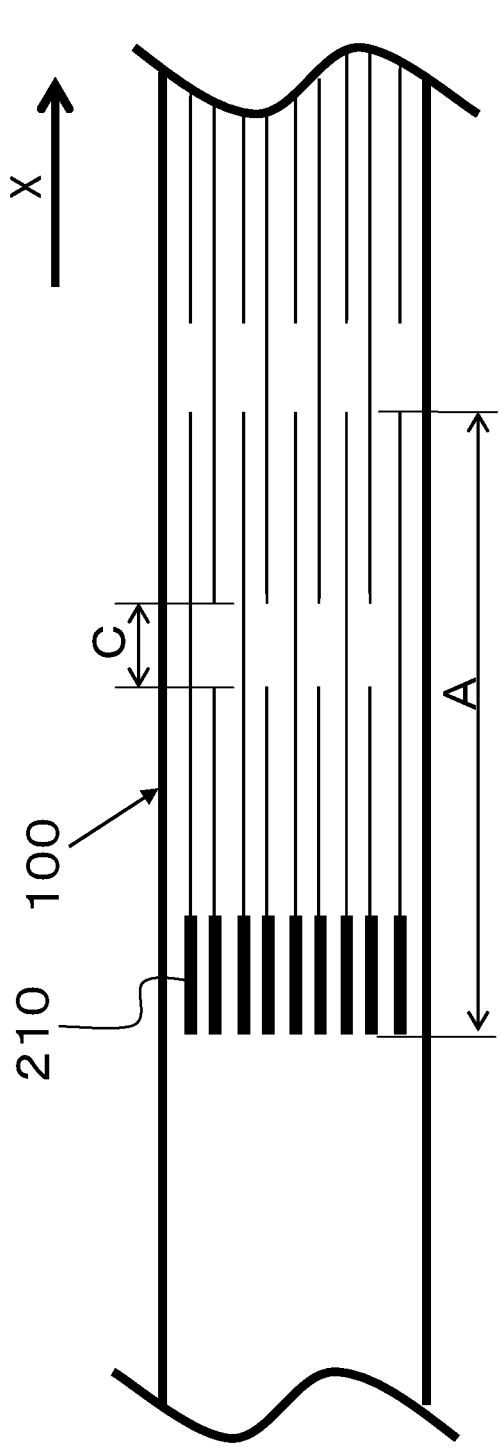
FIGS. 6A and 6B are schematic views illustrating use of a fiber separating device having a plurality of vertical blades arranged in line in the width direction of the fiber bundle, with the plurality of vertical blades stuck into the fiber bundle at different timings, including FIG. 6A schematic plan view, and FIG. 6B schematic front elevation view.
Figure 6B:
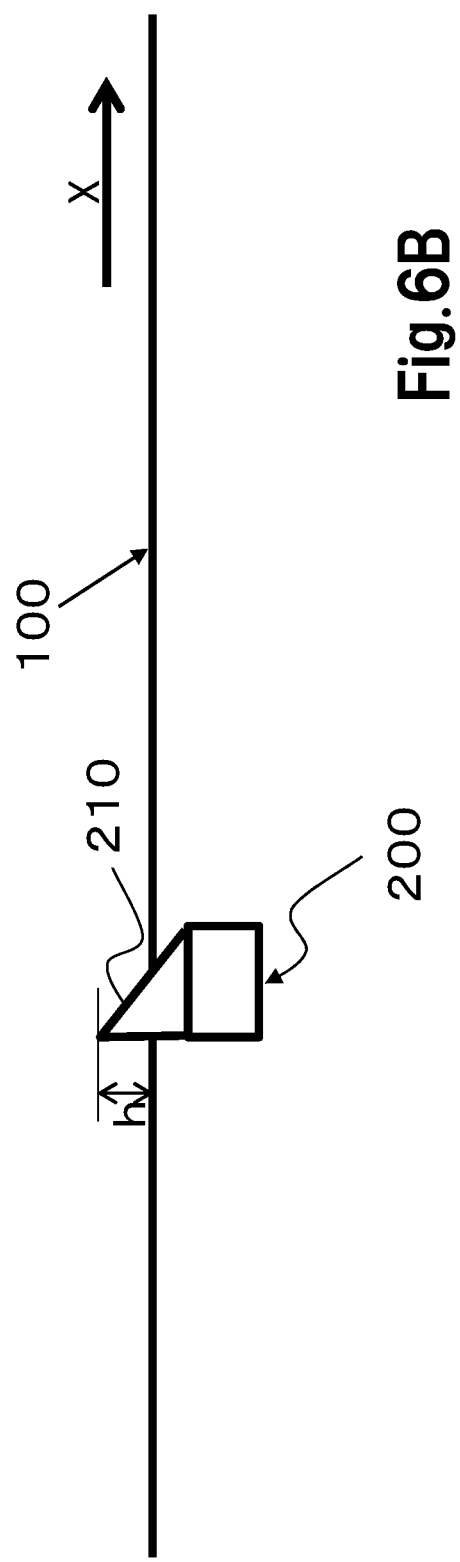

FIGS. 6A and 6B illustrate a mode in which a plurality of projections 210 are arranged in parallel to the width direction of the fiber bundle, and the projections 210 are stuck into and removed from at different timings. Difference in the timing of sticking of the adjacent projections into the fiber bundle is preferably 0.2 cycles or larger and 0.8 cycles or smaller, more preferably 0.3 cycles or larger and 0.7 cycles or smaller, and even more preferably 0.4 cycles or larger and 0.6 cycle or smaller. With the sticking and removal controlled within these ranges, it becomes possible to manufacture the partially separated fiber bundle that can suppress fluffing, and can yield chopped fibers with relatively uniform width of separated fiber. One cycle means the time from when the projection is stuck into the fiber bundle, kept stuck for a certain length of time, removed, and then stuck again. Length A (mm) of the separated fiber section ascribed to one projection is preferably 30 mm or longer and 1500 mm or shorter, meanwhile length C (mm) of the unseparated fiber section ascribed to one projection is preferably 1 mm or longer and 150 mm or shorter. Within this range, load on the fiber separating device may be reduced, making it possible to manufacture the partially separated fiber bundle that can yield chopped fibers with relatively uniform width of separated fiber.

In the examples illustrated in FIGS. 4A to 6B, it is also preferable to control the timing of sticking and removing the projections of the fiber separating device so that there will be no section in which unseparated fiber sections appear over the entire width of the fiber bundle. Such control makes it possible to manufacture the partially separated fiber bundle in which the width of each of the separated fiber bundles is relatively uniform.

Figure 7A:
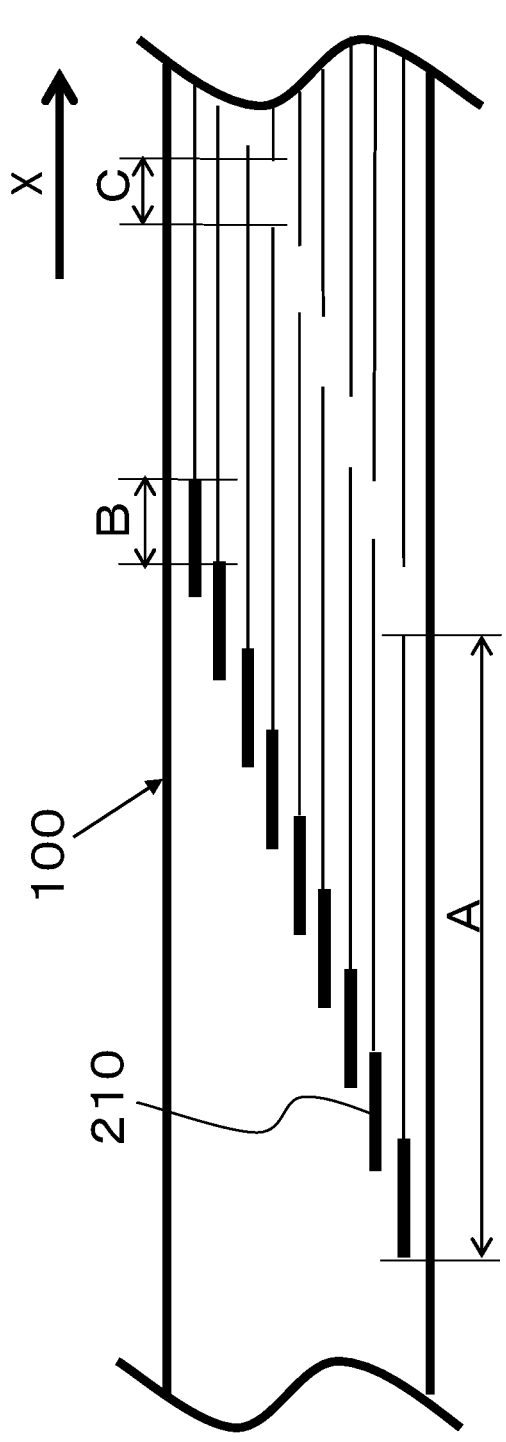
FIGS. 7A and 7B are schematic views illustrating a fiber separating device having a plurality of obliquely arranged vertical blades stuck into a fiber bundle, including FIG. 7A schematic plan view, and FIG. 7B schematic front elevation view.
Figure 7B:
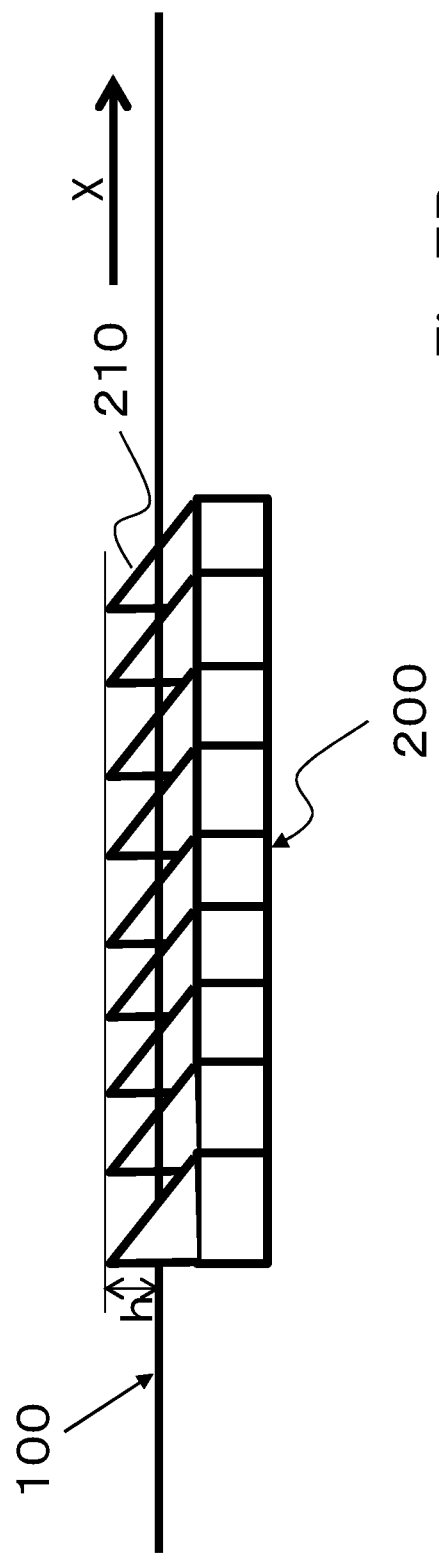

FIGS. 7A and 7B illustrate a mode in which a plurality of projections 210 are serially arranged diagonally to the width direction of the fiber bundle, and the projections 210 are stuck and removed all at once. Similar to FIGS. 4A to 5B, two or more projections 210 diagonally arranged in the longitudinal direction of the fiber bundle are simultaneously stuck into the fiber bundle during a single run of fiber separation. Therefore, it becomes possible to manufacture the partially separated fiber bundle that can suppress fluffing, and can yield chopped fibers with relatively uniform width of separated fiber in the same way as in the modes illustrated in FIGS. 4A to 5B.

Length A (mm) of the separated fiber section ascribed to one projection is preferably 30 mm or longer and 1500 mm or shorter, distance B (mm) in the longitudinal direction between the adjacent projections on the upstream side and downstream side is preferably 5 mm or longer and 1500 mm or shorter, and length C (mm) of the unseparated fiber section ascribed to one projection is preferably 1 mm or longer and 150 mm or shorter. Within this range, load on the fiber separating device may be reduced, making it possible to manufacture the partially separated fiber bundle that can yield chopped fibers with relatively uniform width of separated fiber.

The thus obtained partially separated fiber bundle preferably has a sizing agent applied thereto. Next, timing of applying the sizing agent will be explained with reference to FIGS. 9 to 13. FIG. 9 illustrates an exemplary timing of a sizing agent application step, in the process of manufacturing the reinforcing fiber bundle. FIG. 9 illustrates a process of subjecting the fiber bundle 100 to a fiber separation step 300 to yield the partially separated fiber bundle 180, during which a sizing agent application step 400, including a sizing agent coating step 401, a drying step 402, and an heat treating step 403, precedes the fiber separation step 300 as pattern A, and succeeds the fiber separation step 300 as pattern B. Both timings of pattern A and pattern B are acceptable. The sizing agent application step does not always necessarily include the drying step and the heat treating step.

Figure 10:
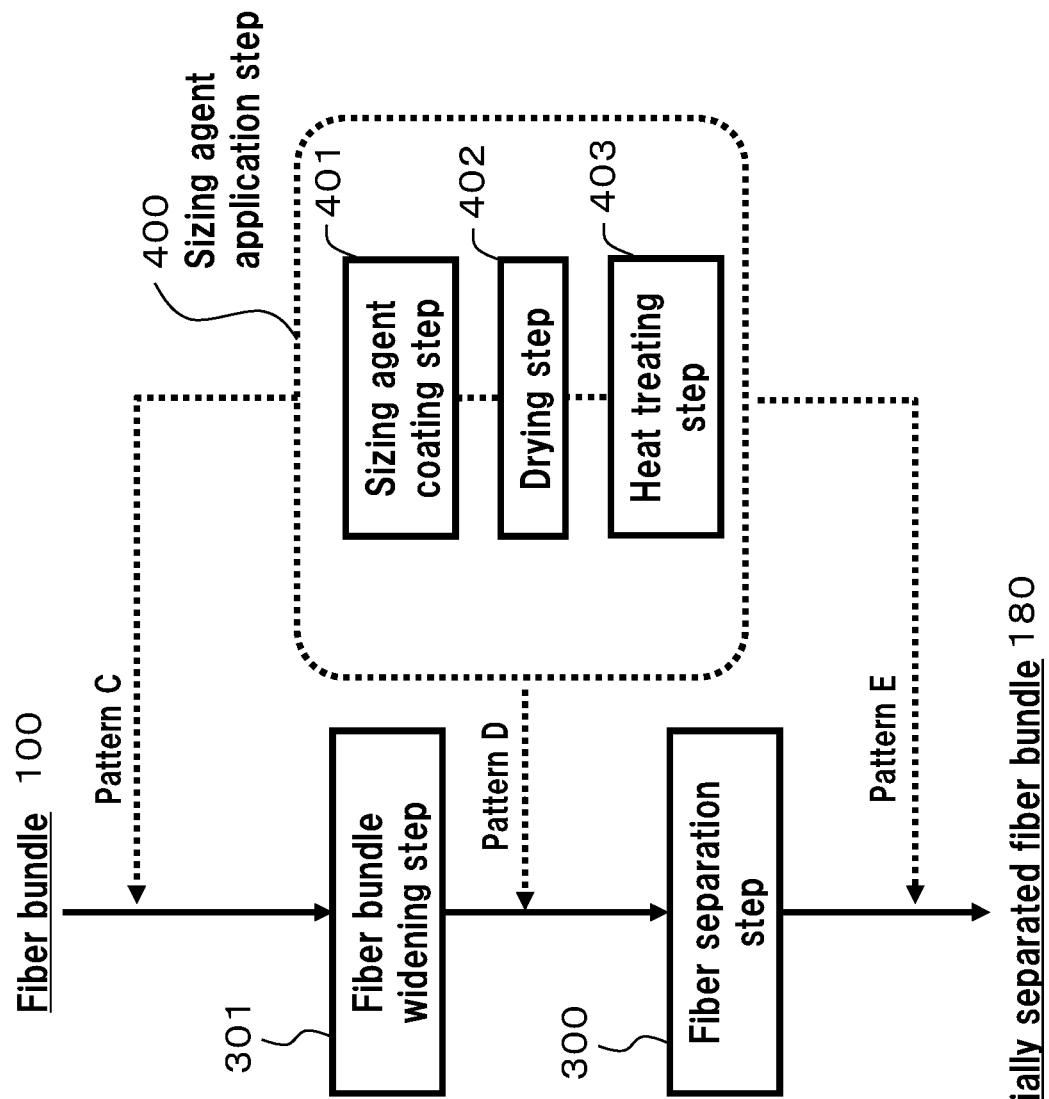
FIG. 10 is a process chart illustrating exemplary timing of a sizing agent application step that includes a sizing agent coating step and a drying step, in the method of manufacturing a partially separated fiber bundle.

FIG. 10 illustrates an exemplary timing of the sizing agent application step 400 in the process of manufacturing the reinforcing fiber bundle including a fiber bundle widening step 301. FIG. 10 illustrates a process of subjecting the fiber bundle 100 to the fiber bundle widening step 301 and the fiber separation step 300 in this order to yield the partially separated fiber bundle 180, during which a sizing agent application step 400 precedes the fiber bundle widening step 301 as pattern C, is interposed between the fiber bundle widening step 301 and the fiber separation step 300 as pattern D, and succeeds the fiber separation step 300 as pattern E. Among the timings of pattern C, pattern D and pattern E, although all being acceptable, most preferred is pattern D, since the fiber separation may be carried out without causing fluffing, and at high accuracy of width even in narrow-width separation, and since the ratio $A_{max}/A_{min}$ of the maximum value $A_{max}$ (units/mm) and the minimum value $A_{min}$ (units/mm), found from among the fiber separating numbers per unit width ($A_1$ to $A_{100}$), becomes controllable. Also, the patterns illustrated in this figure does not always necessarily include the drying step and the heat treating step.

Figure 11:
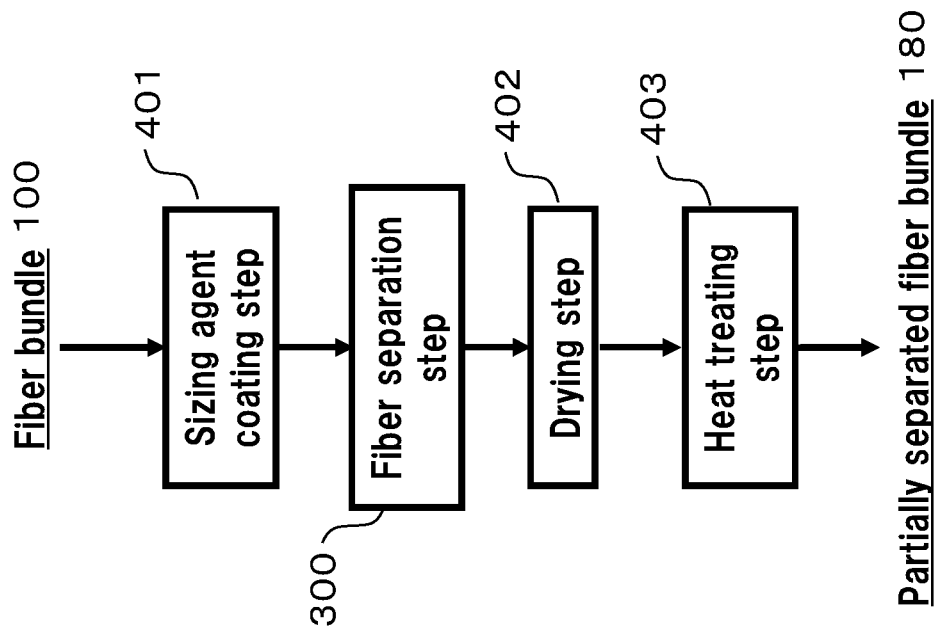
FIG. 11 is a process chart illustrating another exemplary timing of a sizing agent application step that includes a sizing agent coating step and a drying step, in the method of manufacturing a partially separated fiber bundle.

FIG. 11 illustrates another exemplary timing of the sizing agent coating step, the drying step and the heat treating step, in the process of manufacturing the reinforcing fiber bundle. In the exemplary timing illustrated in FIG. 11, the sizing agent coating step 401, the drying step 402, and the heat treating step 403 in the sizing agent application step are separated, and individually carried at independent timings. The sizing agent coating step 401 precedes the fiber separation step 300, and the drying step 402 and the heat treating step 403 succeed the fiber separation step 300.

Figure 12:
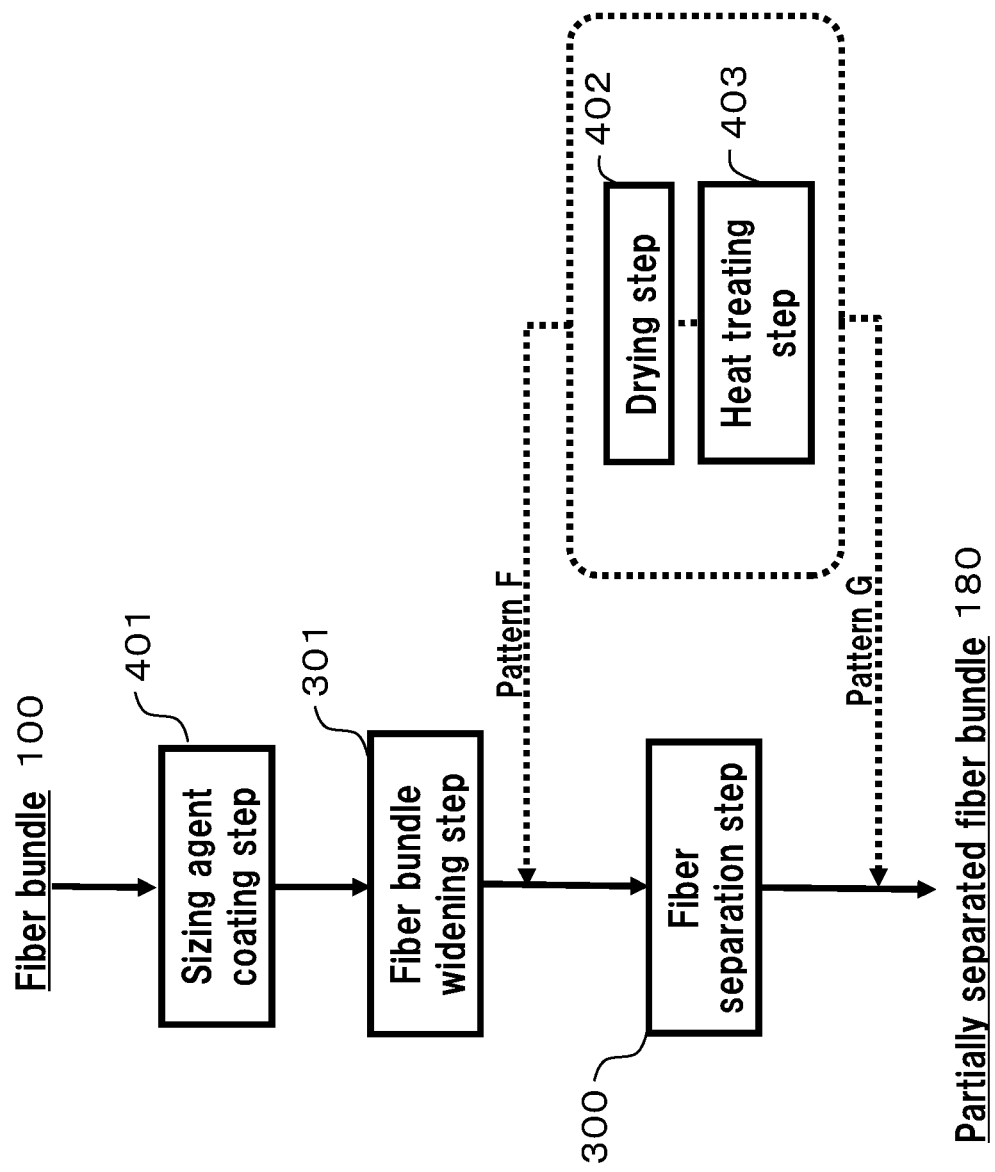
FIG. 12 is a process chart illustrating exemplary timing of a sizing agent application step that includes a sizing agent coating step and a drying step, in the method of manufacturing a partially separated fiber bundle including a fiber bundle widening step.

FIG. 12 illustrates an exemplary timing of the sizing agent application step that includes the sizing agent coating step, the drying step, and the heat treating step, in the process of manufacturing the reinforcing fiber bundle that includes the fiber bundle widening step in which in the process of subjecting the fiber bundle 100 to the fiber bundle widening step 301 and the fiber separation step 300 in this order to yield the partially separated fiber bundle 180, the sizing agent coating step 401 of the sizing agent application step precedes the fiber bundle widening step 301. Meanwhile, the drying step 402 and the heat treating step 403 are interposed between the fiber bundle widening step 301 and the fiber separation step 300 as pattern F, or succeed the fiber separation step 300 as pattern G.

Figure 13:
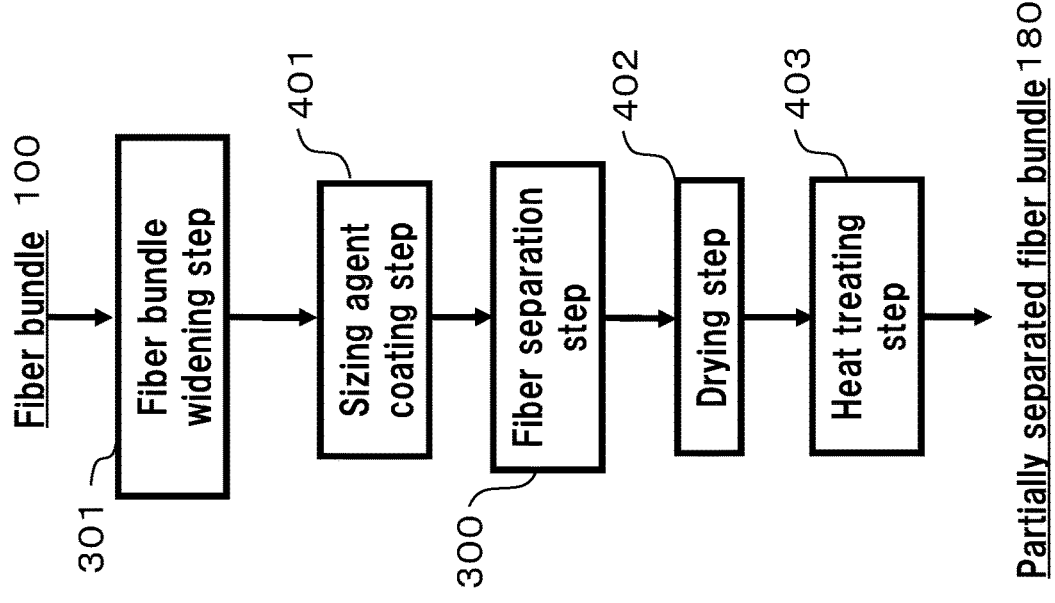
FIG. 13 is a process chart illustrating another exemplary timing of a sizing agent application step that includes a sizing agent application step and a drying step, in the method of manufacturing a partially separated fiber bundle including a fiber bundle widening step.

FIG. 13 illustrates another exemplary timing of the sizing agent application step that includes the sizing agent coating step, the drying step and the heat treating step, in the process of manufacturing the reinforcing fiber bundle that includes the fiber bundle widening step in which in the process of subjecting the fiber bundle 100 to the fiber bundle widening step 301 and the fiber separation step 300 in this order to yield the partially separated fiber bundle 180, the sizing agent coating step 401 of the sizing agent application step is interposed between the fiber bundle widening step 301 and the fiber separation step 300, and the drying step 402 and the heat treating step 403 succeed the fiber separation step 300.

As described above, in the method of manufacturing a partially separated fiber bundle, the sizing agent can be applied at various timings.

EXAMPLES

Our fiber bundles and methods will be described in detail below, referring to Examples. Various measurement methods, calculation methods and evaluation methods are as follows.

(1) Fiber Separating Number

As illustrated in FIG. 1, at freely selectable points $P_n$ (n=1 to 100) of the fiber bundle, measured were full width $W_n$ (n=1 to 100) (mm) of the fiber bundle that ranges from end to end, and the number of fiber bundles $N_n$ (n=1 to 100) (units) that form the fiber bundle having a width of 0.1 mm or larger. The measurement was repeated at 100 points, at intervals of 50 cm or longer, in the longitudinal direction of a partially separated fiber bundle. The number $N_n$ of fiber bundles having a bundle width of 0.1 mm or more, was divided by the full width $W_n$ of the fiber bundles, to determine the fiber separating number per unit width $N_n/W_n=A_n$ (units/mm). Among 100 points, the maximum of the fiber separating number per unit width was defined as $A_{max}$ (units/mm), and the minimum of fiber separating number per unit width was defined as $A_{min}$ (units/mm).

(2) Adhesion Amount of Sizing Agent

Approximately 5 g of a carbon fiber bundle with a sizing agent adhered thereto was sampled, and was put in a heat-resistant vessel. The vessel was then dried at 80° C. in vacuo for 24 hours, cooled to room temperature with care to avoid moisture absorption, the carbon fiber was weighed to find mass m1 (g), and then ashed together with the vessel in a nitrogen atmosphere at 500° C. for 15 minutes. The sample was then cooled to room temperature with care to avoid moisture absorption, and the carbon fiber was weighed to find mass m2 (g). After the processes, the adhesion amount of sizing agent adhered to the carbon fiber was determined by the equation below. The measurement was repeated for each of 10 fiber bundles, and an average value was calculated.

Adhesion amount of sizing agent (mass %)=100×{(m1−m2)/m1}

(3) Stability of Fiber Separation Process

Continuous operation time is defined as the time ranging from the start of the fiber separation up to when the operation comes to a deadlock due to entanglement of fibers around separation blades or rolls. A continuous operation time of one hour or longer was judged as A, the time of 30 minutes or longer and shorter than one hour was judged as B, and the time of shorter than 30 minutes was judged as C.

(4) Evaluation of Uniformity of Evaluation of Uniformity of Fiber Separating Number The ratio $A_{max}/A_{min}$ of the maximum value $A_{max}$ (fibers/mm) and the minimum value $A_{min}$ (fibers/mm) found from among the fiber separating numbers per unit width ($A_1$ to $A_{100}$) smaller than 2 was judged as A, the ratio of 2 or larger and 3 or smaller was judged as B, and the ratio exceeding 3 was judged as C.

(5) Mechanical Properties

A fiber-reinforced resin molding material was subjected to the method described later to obtain a flat plate molded article having a size of 300×300 mm. Assuming the longitudinal direction of the flat plate as 0°, sixteen test pieces, each piece being 100×25×2 mm, were cut out from the obtained flat plate in 0° direction and 90° direction (32 pieces in total). The pieces are then subjected to measurement in accordance with JIS K 7074 (1988) to find average value, standard deviation, and coefficient of variation (=standard deviation/average value×100) of bending strength. Averaged value of bending strength of 350 MPa or larger was judged as A, the value 200 MPa or larger and smaller than 350 MPa was judged as B, and the value smaller than 200 MPa was judged as C. The coefficient of variation of bending strength of smaller than 10% was judged as A, the value of 10% or larger and smaller than 15% was judged as B, and the value of 15% or larger was judged as C.

Materials for Use

Material fiber 1: Carbon fiber bundle ("PX35" from ZOLTEK Corporation, 50,000 single yarns, with "13" sizing agent) was used.

Material fiber 2: Carbon fiber bundle ("T700SC-24K-50C" from Toray Industries, Inc., 24,000 single yarns) was used.

Resin sheet 1: A sheet was prepared using a polyamide masterbatch made of polyamide 6 resin ("Amilan" (registered trademark) CM1001 from Toray Industries, Inc.).

Resin sheet 2: A sheet was prepared using a polypropylene masterbatch composed of 90% by mass of unmodified polypropylene resin ("Prime Polypro" (registered trademark) J106MG from Prime Polymer Co., Ltd.), and 10% by mass of an acid-modified polypropylene resin ("Admer" (registered trademark) QE800, from Mitsui Chemicals, Inc.).

Sizing agent 1: Water-soluble polyamide ("T-70" from Toray Industries, Inc.) was used.

Sizing agent 2: Water-soluble polyamide ("A-90" from Toray Industries, Inc.) was used.

Method of Manufacturing Widened Fiber Bundle

The material fiber was unwound at a constant speed of 10 m/min by using a winder, allowed to pass through vibrating widening rolls that vibrate in the axial direction at 10 Hz for widening, and then allowed to pass through width-limiting rolls to be a widened fiber bundle with a desired width.

Then, the widened fiber bundle was continuously immersed in a sizing agent diluted with purified water. Next, the widened fiber bundle coated with the sizing agent was fed to a hot roller at 250° C. and a drying oven at 250° C. (under air atmosphere) to dry and remove water, and then heat treated for 1.5 minutes.

Method of Manufacturing Fiber Reinforced Thermoplastic Resin Molding Material

The obtained partially separated fiber bundle was confirmed to be separated in the width direction so that fiber bundles have a desired width within the separated fiber section, and to have an entanglement accumulated part in which entangled parts formed of entangled single yarns are accumulated at one end part or both end parts of at least one separated fiber section.

The obtained partially separated fiber bundle was then continuously fed to a rotary cutter to cut the fiber bundles, and then cast to disperse uniformly, to thereby obtain a discontinuous fiber non-woven fabric in which the fiber orientation is isotropic.

The discontinuous fiber non-woven fabric was then sandwiched between resin sheets placed on the top and the bottom, and the resin was then allowed to impregnate into the non-woven fabric by using a press machine, to thereby obtain a sheet-like fiber-reinforced thermoplastic resin molding material.

Example 1

A 40-mm-wide widened fiber bundle, with approximately 4% of Sizing agent 2 adhered to Material fiber 1, was separated by using a fiber separating device having 50 vertical blades arranged in line at regular intervals in the width direction of the fiber bundle as illustrated in FIGS. 6A and 6B. The fiber separating device in this process was operated to repeat a cycle of sticking the vertical blades into the widened fiber bundle that travels at a constant speed of 10 m/min, keeping the vertical blades stuck for 3 seconds to form the separated fiber sections, keeping the vertical blades removed for 0.2 seconds, and then sticking them again. Timings of sticking of the adjacent vertical blades into the fiber bundle were shifted by 0.5 cycles, and height h of the projection above the surface of the fiber bundle was adjusted to 17 mm. The obtained partially separated fiber bundle was cut into 13 mm length, and then a fiber-reinforced thermoplastic resin molding material having Resin sheet 1 as the matrix was prepared. The results are summarized in Table 1.

Example 2

A 20-mm-wide widened fiber bundle, with approximately 4% of Sizing agent 1 adhered to Material fiber 2, was separated by using a fiber separating device having 50 vertical blades arranged in two rows (25 blades on the upstream side, and 25 blades on the downstream side) in a staggered manner, and at regular intervals in the width direction of the fiber bundle as illustrated in FIGS. 5A and 5B. The fiber separating device in this process was operated to repeat a cycle of sticking the vertical blades into the widened fiber bundle that travels at a constant speed of 10 m/min, keeping the vertical blades stuck for 3 seconds to form the separated fiber sections, keeping the vertical blades removed for 0.2 seconds, and then sticking them again. Distance B between the adjacent vertical blades in the longitudinal direction of the fiber bundle was adjusted to 15 mm, timing of sticking of all blades into the fiber bundle was set to be synchronized, and height h of the projection above the surface of the fiber bundle was adjusted to 17 mm. The obtained partially separated fiber bundle was cut into 13 mm length, and then a fiber-reinforced thermoplastic resin molding material having Resin sheet 2 as the matrix was prepared. The results are summarized in Table 1.

Example 3

A 20-mm-wide widened fiber bundle, with approximately 4% of Sizing agent 1 adhered to Material fiber 2, was separated by using a rotary blade (fiber separating device) having 25 projections (blades) arranged in two rows in total in a staggered manner, and at regular intervals in the width direction of the fiber bundle as illustrated in FIGS. 4A and 4B. The fiber separating device in this process was operated to repeat a cycle of sticking the projections into the widened fiber bundle that travels at a constant speed of 10 m/min, keeping the projections stuck for 3 seconds to form the separated fiber sections, keeping the projections removed for 0.2 seconds, and then sticking them again. Distance B between the adjacent projections in the longitudinal direction of the fiber bundle was adjusted to 15 mm, timing of sticking of all projections (50 projections in total) into the fiber bundle was set to be synchronized, and height h of the projection above the surface of the fiber bundle was adjusted to 4 mm. The obtained partially separated fiber bundle was cut into 13 mm length, and then a fiber-reinforced thermoplastic resin molding material having Resin sheet 2 as the matrix was prepared. The results are summarized in Table 1.

Example 4

A 20-mm-wide widened fiber bundle, with approximately 3.5% of Sizing agent 2 adhered to Material fiber 2, was separated by using a fiber separating device having 25 vertical blades arranged diagonally in line at regular intervals in the width direction of the fiber bundle, while keeping a longitudinal distance B of 5 mm as illustrated in FIGS. 7A and 7B. The fiber separating device in this process was operated to repeat a cycle of sticking the vertical blades into the widened fiber bundle that travels at a constant speed of 10 m/min, keeping the vertical blades stuck for 3 seconds to form the separated fiber sections, keeping the vertical blades removed for 0.2 seconds, and then sticking them again. Timing of sticking of all blades into the fiber bundle was set to be synchronized, and the height h of the projection above the surface of the fiber bundle was adjusted to 8 mm. The obtained partially separated fiber bundle was cut into 13 mm length, and then a fiber-reinforced thermoplastic resin molding material having Resin sheet 2 as the matrix was prepared. The results are summarized in Table 1.

Example 5

A 20-mm-wide widened fiber bundle, with approximately 3.5% of Sizing agent 2 adhered to Material fiber 2, was separated by using a fiber separating device having 65 vertical blades arranged in line at regular intervals in the width direction of the fiber bundle as illustrated in FIGS. 6A and 6B. The fiber separating device in this process was operated to repeat a cycle of sticking the vertical blades into the widened fiber bundle that travels at a constant speed of 10 m/min, keeping the vertical blades stuck for 3 seconds to form the separated fiber sections, keeping the vertical blades removed for 0.2 seconds, and then sticking them again. Timings of sticking of the adjacent blades into the fiber bundle were shifted by 0.5 cycles, and the height h of the projection above the surface of the fiber bundle was adjusted to 13 mm. The obtained partially separated fiber bundle was cut into 13 mm length, and then a fiber-reinforced thermoplastic resin molding material having Resin sheet 2 as the matrix was prepared. The results are summarized in Table 1.

Comparative Example 1

A 40-mm-wide widened fiber bundle, with approximately 3% of Sizing agent 1 adhered to Material fiber 1, was separated by using a fiber separating device having 48 vertical blades arranged in two rows (40 blades on the upstream side, and 8 blades on the downstream side) in a staggered manner, and at regular intervals in the width direction of the fiber bundle as illustrated in FIGS. 5A and 5B. The fiber separating device in this process was operated to repeat a cycle of sticking the vertical blades into the widened fiber bundle that travels at a constant speed of 10 m/min, keeping the vertical blades stuck for 3 seconds to form the separated fiber sections, keeping the vertical blades removed for 0.2 seconds, and then sticking them again. Distance B between the adjacent vertical blades in the longitudinal direction of the fiber bundle was adjusted to 15 mm, timing of sticking of all blades into the fiber bundle was set to be synchronized, and the height h of the projection above the surface of the fiber bundle was adjusted to 12 mm. The obtained partially separated fiber bundle was cut into 13 mm length, and then a fiber-reinforced thermoplastic resin molding material having Resin sheet 1 as the matrix was prepared. The results are summarized in Table 2.

Comparative Example 2

Figure 8A:
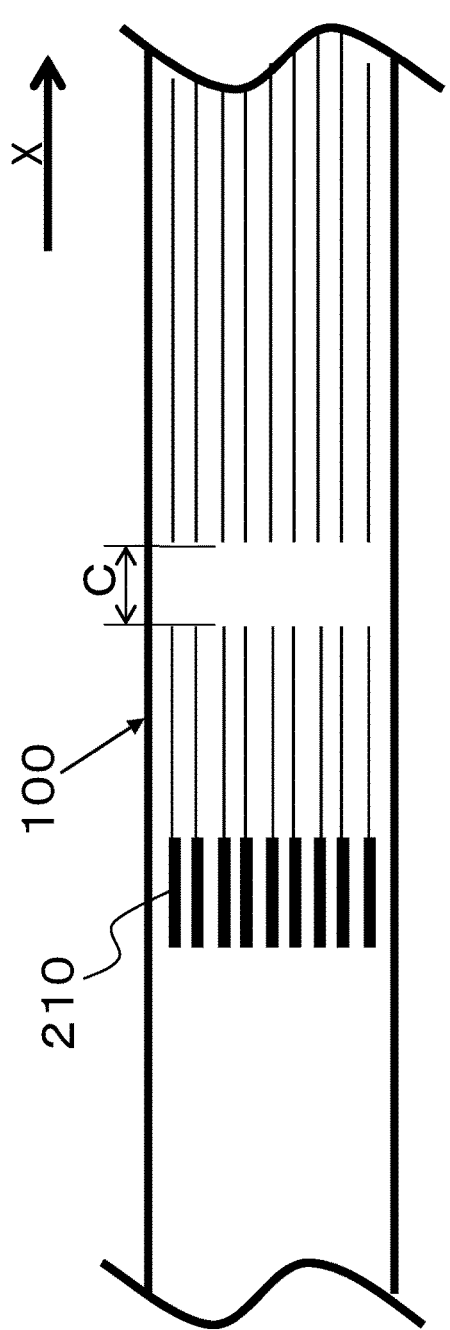
FIGS. 8A and 8B are schematic views illustrating use of a rotary fiber separating device having a plurality of projections arranged in line in the width direction of the fiber bundle, with the plurality of projections stuck into the fiber bundle all at once, including FIG. 8A schematic plan view, and FIG. 8B schematic front elevation view.
Figure 8B:
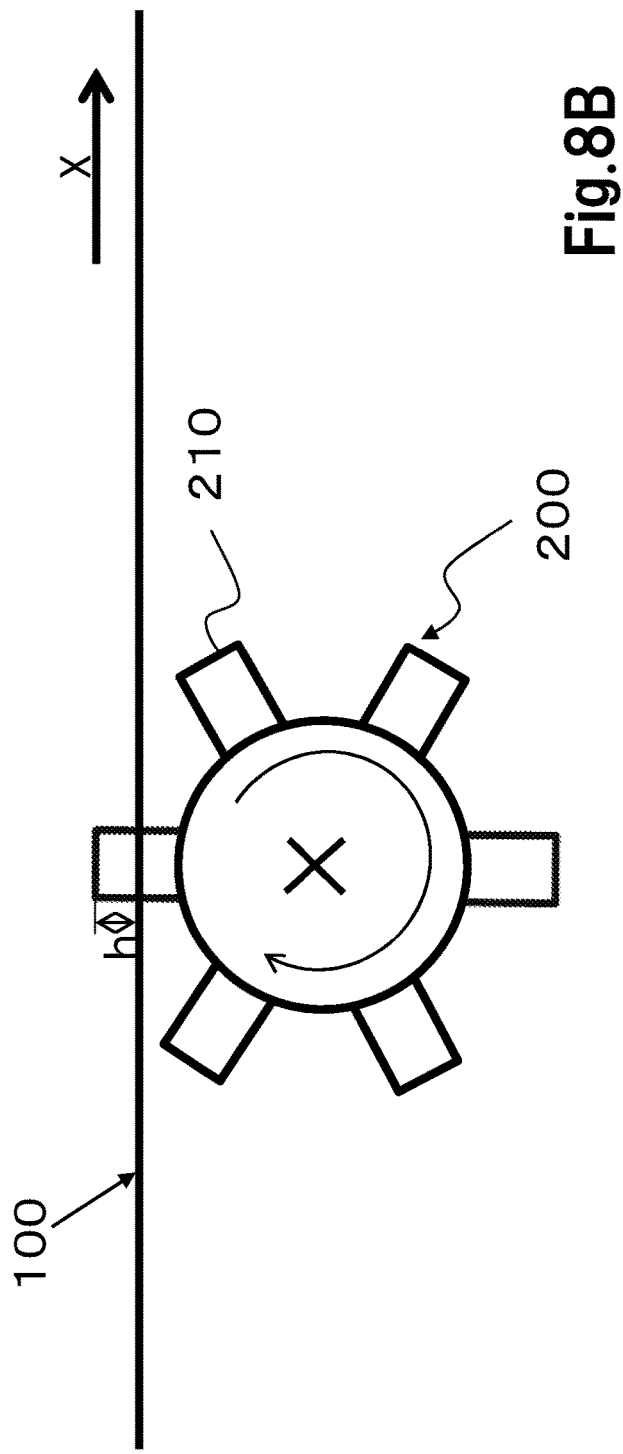

A 40-mm-wide widened fiber bundle, with approximately 4% of Sizing agent 2 adhered to Material fiber 1, was separated by using a rotary blade (fiber separating device) having 50 projections (blades) arranged in line at regular intervals in the width direction of the fiber bundle as illustrated in FIGS. 8A and 8B. The fiber separating device in this process was operated to repeat a cycle of sticking the projections into the widened fiber bundle that travels at a constant speed of 10 m/min, keeping the projections stuck for 3 seconds to form the separated fiber sections, keeping the fiber separating device removed for 0.2 seconds, and then sticking them again. Timing of sticking of all blades (50 blades in total) arranged at regular intervals in the width direction of the fiber bundle into the fiber bundle was set to be synchronized, and the height h of the projection above the surface of the fiber bundle was adjusted to 13 mm. The obtained partially separated fiber bundle was cut into 13 mm length, and then a fiber-reinforced thermoplastic resin molding material having Resin sheet 1 as the matrix was prepared. The results are summarized in Table 2.

Comparative Example 3

A 20-mm-wide widened fiber bundle, with approximately 4% of Sizing agent 1 adhered to Material fiber 2, was separated by using a fiber separating device having 44 vertical blades arranged in two rows (33 blades on the upstream side, and 11 blades on the downstream side) in a staggered manner, and at regular intervals in the width direction of the fiber bundle as illustrated in FIGS. 5A and 5B. The fiber separating device in this process was operated to repeat a cycle of sticking the vertical blades into the widened fiber bundle that travels at a constant speed of 10 m/min, keeping the vertical blades stuck for 3 seconds to form the separated fiber sections, keeping the vertical blades removed for 0.2 seconds, and then sticking them again. Distance B between the adjacent vertical blades in the longitudinal direction of the fiber bundle was adjusted to 15 mm, timing of sticking of all blades into the fiber bundle was set to be synchronized, and the height h of the projection above the surface of the fiber bundle was adjusted to 15 mm. The obtained partially separated fiber bundle was cut into 13 mm length, and then a fiber-reinforced thermoplastic resin molding material having Resin sheet 2 as the matrix was prepared. The results are summarized in Table 2.

Comparative Example 4

A 20-mm-wide widened fiber bundle, with approximately 3.5% of Sizing agent 2 adhered to Material fiber 2, was separated by using a fiber separating device having 50 vertical blades arranged in line at regular intervals in the width direction of the fiber bundle as illustrated in FIGS. 6A and 6B. All the blades in this process were normally kept stuck into the widened fiber bundle that travels at a constant speed of 10 m/min, with the height h of the projection above the surface of the fiber bundle adjusted to 21 mm. The results are summarized in Table 2, while the separation had to be interrupted due to accumulation of fluffs on the blades that are constantly kept stuck in the bundle and sufficient amount of partially separated fiber bundle for evaluating the physical properties was not obtained.

TABLE 1

| Target | Item | | Example 1 | Example 2 | Example 3 | Example 4 | Example 5 |
|---|---|---|---|---|---|---|---|
| Material | Carbon fiber | | Material fiber 1 | Material fiber 2 | Material fiber 2 | Material fiber 2 | Material fiber 2 |
| | Sizing agent | | Sizing agent 2 | Sizing agent 1 | Sizing agent 1 | Sizing agent 2 | Sizing agent 2 |
| | Adhesion amount of sizing agent | % | 4 | 4 | 4 | 3.5 | 3.5 |
| | Resin | | Resin sheet 1 | Resin sheet 2 | Resin sheet 2 | Resin sheet 2 | Resin sheet 2 |
| Bundle properties | Broadened width | mm | 40 | 20 | 20 | 20 | 20 |
| | Maxmum width of separated fiber | mm | 1.8 | 0.8 | 0.8 | 0.8 | 0.3 |
| | Minimum width of separated fiber | mm | 0.8 | 0.4 | 0.4 | 0.4 | 0.2 |
| | Minimum value of fiber separating number $A_{min}$ | Units/mm | 0.6 | 1.3 | 1.3 | 1.3 | 3.3 |
| | Maximum value of fiber separating number $A_{max}$ | Units/mm | 1.3 | 2.5 | 2.5 | 2.5 | 4.0 |
| | Amax/Amin | | 2.3 | 2.0 | 2.0 | 2.0 | 1.2 |
| | Number of measurement points where 80% or more of maximum value of fiber separating number $A_{max}$ is attained (out of 100 points) | Points | 35 | 69 | 58 | 73 | 81 |
| | Number of measurement points where 60% or less of maximum value of fiber separating number $A_{max}$ is attained (out of 100 points) | Points | 54 | 16 | 17 | 21 | 13 |
| Separation method | Longitudinal arrangement of blades | | | Staggered arrangement | Staggered arrangement | | |
| | Width-wise arrangement of blades | | Equal in width direction | | | Diagonally in line | Equal in width direction |
| | Number of upstream blades in width direction | | 50 | 25 | 25 | 1 | 65 |
| | Number of downstream blades in width direction | | | 25 | 25 | 1 | |
| | Intervals of upstream blades (in width direction of fiber bundle) | mm | | 0.8 | 0.8 | | |
| | Intervals of downstream blades (in width direction of fiber bundle) | mm | | 0.8 | 0.8 | | |
| | Ratio of blade number at downstream side and upstream side (≥1) | | | 1.0 | 1.0 | 1 | |
| | Maximum number of blades stuck into fiber bundle | | 50 | 50 | 50 | 25 | 65 |
| | Timing of blade sticking | | 0.5 cycles shifted between adjacent blades | Simultaneous | Simultaneous | Simultaneous | 0.5 cycles shifted between adjacent blades |
| | Height of projection | mm | 17 | 17 | 4 | 8 | 13 |
| | FIG. | | 6 | 5 | 4 | 7 | 6 |
| | Blade motion | | Vertical | Vertical | Rotational | Vertical | Vertical |
| Results | Stability of fiber separation process | | A | A | B | A | B |
| | Uniformity of fiber separating number | | B | B | B | B | A |
| | Mechanical property (average value of bending strength) | | A | A | A | A | A |
| | Variation of mechanical property (coefficient of variation of bending strength) | | B | A | A | A | A |

TABLE 2

| Target | Item | | Comparative example 1 | Comparative example 2 | Comparative example 3 | Comparative example 4 |
|---|---|---|---|---|---|---|
| Material | Carbon fiber | | Material fiber 1 | Material fiber 1 | Material fiber 2 | Material fiber 2 |
| | Sizing agent | | Sizing agent 1 | Sizing agent 2 | Sizing agent 1 | Sizing agent 2 |
| | Adhesion amount of sizing agent | % | 3 | 4 | 4 | 3.5 |
| | Resin | | Resin sheet 1 | Resin sheet 1 | Resin sheet 2 | |
| Bundle properties | Broadened width | mm | 40 | 40 | 20 | 20 |
| | Maxmum width of separated fiber | mm | 5.0 | 40.0 | 1.8 | 0.4 |
| | Minimum width of separated fiber | mm | 0.8 | 0.4 | 0.5 | 0.4 |
| | Minimum value of fiber separating number $A_{min}$ | Units/mm | 0.2 | 0.03 | 0.6 | 2.5 |
| | Maximum value of fiber separating number $A_{max}$ | Units/mm | 1.2 | 2.5 | 2.2 | 2.6 |
| | Amax/Amin | | 6.0 | 100.0 | 4.0 | 1.0 |
| | Number of measurement points where 80% or more of maximum value of fiber separating number $A_{max}$ is attained (out of 100 points) | Points | 64.0 | 74 | 75 | 67 |
| | Number of measurement points where 60% or less of maximum value of fiber separating number $A_{max}$ is attained (out of 100 points) | Points | 23.0 | 13 | 22 | 17 |
| Separation method | Longitudinal arrangement of blades | | Staggered arrangement | Equal in longitudinal direction | Staggered arrangement | |
| | Width-wise arrangement of blades | | | Equal in width direction | | Equal in width direction |
| | Number of upstream blades in width direction | | 40 | 50 | 33 | 50 |
| | Number of downstream blades in width direction | | 8 | | 11 | |
| | Intervals of upstream blades (in width direction of fiber bundle) | mm | 1.0 | | 0.6 | |
| | Intervals of downstream blades (in width direction of fiber bundle) | mm | 5.0 | | 1.8 | |
| | Ratio of blade number at downstream side and upstream side (≥1) | | 5.0 | | 3.0 | |
| | Maximum number of blades stuck into fiber bundle | | 48 | 50 | 44 | 50 |
| | Timing of blade sticking | | Simultaneous | Simultaneous | Simultaneous | Constantly stuck |
| | Height of projection | mm | 12 | 13 | 15 | 21 |
| | FIG. | | 5 | 8 | 5 | 6 |
| | Blade motion | | Vertical | Rotational | Vertical | Vertical |
| Results | Stability of fiber separation process | | A | A | A | C |
| | Uniformity of fiber separating number | | C | C | C | A |
| | Mechanical property (average value of bending strength) | | A | B | A | |
| | Variation of mechanical property (coefficient of variation of bending strength) | | C | C | C | |

INDUSTRIAL APPLICABILITY

Our methods are applicable to any fiber bundle composed of a plurality of single yarns, desired to be separated into a plurality of fine bundles. In particular, when used as a carbon fiber-sheet molding compound (CF-SMC) to be cut into predetermined length before use, or as a fiber bundle for a stampable sheet, obtainable is a composite that is inexpensive and has mechanical properties, with less variation in the mechanical properties.

The invention claimed is:

1. A method of manufacturing a partially separated fiber bundle comprising allowing a fiber bundle that contains a plurality of single yarns to travel in a longitudinal direction and to be widened, and intermittently sticking a fiber separating device into a widened fiber bundle to form a separated fiber section and an unseparated fiber section in the fiber bundle, wherein a sizing agent is applied to the widened fiber bundle between a fiber bundle widening step and a fiber separation step, the sizing agent being a water-soluble polyamide resin, and the fiber separating device is stuck at a plurality of points in a width direction of the fiber bundle while being shifted in the longitudinal direction to adjust $A_{min}$ (units/mm) to 0.5 units/mm or larger and to adjust a ratio $A_{max}/A_{min}$ to 1.1 or larger and 3 or smaller when the number of fiber bundles contained in the width direction of the partially separated fiber bundle (fiber separating number: $N_n$ (units)) measured at a freely selected point $P_n$, wherein n represents an integer of 1 to 100, and freely selected points $P_n$ and $P_{n+1}$, excluding n=100, being 50 cm or more away from each other, is divided by a full width of $W_n$ (mm) of the partially separated fiber bundle, to determine the fiber separating number per unit width $A_n$ (units/mm), and assuming its maximum value as $A_{max}$ (units/mm) and its minimum value as $A_{min}$ (units/mm).

2. The method according to claim 1, wherein the fiber separating device is stuck at a plurality of points in the width direction of the fiber bundle while being shifted in the longitudinal direction with a fiber separating device having a plurality of projections arranged at points corresponding to a plurality of points in the width direction while being shifted in the longitudinal direction to stick the plurality of projections at the same time into the fiber bundle.

3. The method according to claim 1, wherein the fiber separating device is stuck at points in the width direction of the fiber bundle, the number of points ranging from (F/10000−1) or more up to less than (F/50−1), where F is the number of single yarns composing the fiber bundle.

4. The method according to claim 1, further comprising a drying step, and a heat treating step.

* * * * *